(12) United States Patent
Shirane

(10) Patent No.: US 12,533,085 B2
(45) Date of Patent: Jan. 27, 2026

(54) INFORMATION PROCESSING APPARATUS, BIOLOGICAL DATA MEASUREMENT SYSTEM, AND INFORMATION PROCESSING METHOD

(71) Applicant: SONY GROUP CORPORATION, Tokyo (JP)

(72) Inventor: Tomohiro Shirane, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 374 days.

(21) Appl. No.: 17/756,622

(22) PCT Filed: Dec. 1, 2020

(86) PCT No.: PCT/JP2020/044589
§ 371 (c)(1),
(2) Date: May 27, 2022

(87) PCT Pub. No.: WO2021/117536
PCT Pub. Date: Jun. 17, 2021

(65) Prior Publication Data
US 2023/0000439 A1 Jan. 5, 2023

(30) Foreign Application Priority Data
Dec. 9, 2019 (JP) ................. 2019-222099

(51) Int. Cl.
*A61B 5/00* (2006.01)
*A61B 5/11* (2006.01)

(52) U.S. Cl.
CPC ............ *A61B 5/721* (2013.01); *A61B 5/1114* (2013.01); *A61B 5/7225* (2013.01); *A61B 2562/0219* (2013.01); *A61B 2562/0247* (2013.01)

(58) Field of Classification Search
CPC ..... A61B 5/721; A61B 5/1114; A61B 5/7225; A61B 2562/0219; A61B 2562/0247
See application file for complete search history.

(56) References Cited

U.S. PATENT DOCUMENTS 7,558,622 B2 *  7/2009  Tran ...................... A61B 5/1117
                                                         600/509
8,108,036 B2 *  1/2012  Tran ...................... A61B 5/369
                                                         600/509

(Continued)

FOREIGN PATENT DOCUMENTS

EP    2774532 A1 *  9/2014  ............... A61B 5/02
JP    2012-005717 A    1/2012

(Continued)

OTHER PUBLICATIONS

International Search Report and Written Opinion of PCT Application No. PCT/JP2020/044589, issued on Feb. 16, 2021, 11 pages of ISRWO.

*Primary Examiner* — Shirley X Jian
(74) *Attorney, Agent, or Firm* — CHIP LAW GROUP

(57) ABSTRACT

[Object] To provide an information processing apparatus, a biological data measurement system, an information processing method, and a program that can improve the accuracy of acquired biological data. [Solving Means] An information processing apparatus according to the present technology includes a body motion noise prediction unit and a control unit. The body motion noise prediction unit predicts, on the basis of a reference signal that is body motion information of a person to be measured detected by a reference signal sensor, that body motion noise caused by body motion of the person to be measured is added to a detection biological signal detected by a biological sensor from the person to be measured. The control unit controls signal processing of the detection biological signal on the (Continued)

basis of a prediction result of the body motion noise prediction unit.

15 Claims, 13 Drawing Sheets

(56) References Cited

U.S. PATENT DOCUMENTS

| | | | |
|---|---|---|---|
| 8,449,471 B2* | 5/2013 | Tran | A61B 5/7225 |
| | | | 600/485 |
| 8,764,651 B2* | 7/2014 | Tran | A61B 5/7203 |
| | | | 600/300 |
| 9,107,586 B2* | 8/2015 | Tran | A61B 5/14532 |
| 11,631,421 B2* | 4/2023 | Fan | G10L 25/84 |
| | | | 704/233 |
| 2007/0276270 A1* | 11/2007 | Tran | A61B 5/0022 |
| | | | 600/508 |
| 2008/0159365 A1* | 7/2008 | Dubocanin | A61B 5/305 |
| | | | 330/109 |
| 2014/0257050 A1* | 9/2014 | Kuroda | A61B 5/6826 |
| | | | 600/301 |
| 2015/0230756 A1* | 8/2015 | Luna | A61B 5/02108 |
| | | | 600/509 |
| 2017/0110142 A1* | 4/2017 | Fan | G10L 25/84 |
| 2018/0028075 A1* | 2/2018 | Presura | A61B 5/681 |
| 2018/0070839 A1* | 3/2018 | Ritscher | A61B 5/4815 |
| 2018/0296156 A1* | 10/2018 | Penders | A61B 5/721 |
| 2019/0374118 A1 | 12/2019 | Nakagawa et al. | |
| 2023/0000439 A1* | 1/2023 | Shirane | A61B 5/7225 |

FOREIGN PATENT DOCUMENTS

| | | |
|---|---|---|
| JP | 2013-208467 A | 10/2013 |
| JP | 2017-063981 A | 4/2017 |
| JP | 2018110327 | 6/2018 |
| JP | 2019-209042 A | 12/2019 |

* cited by examiner

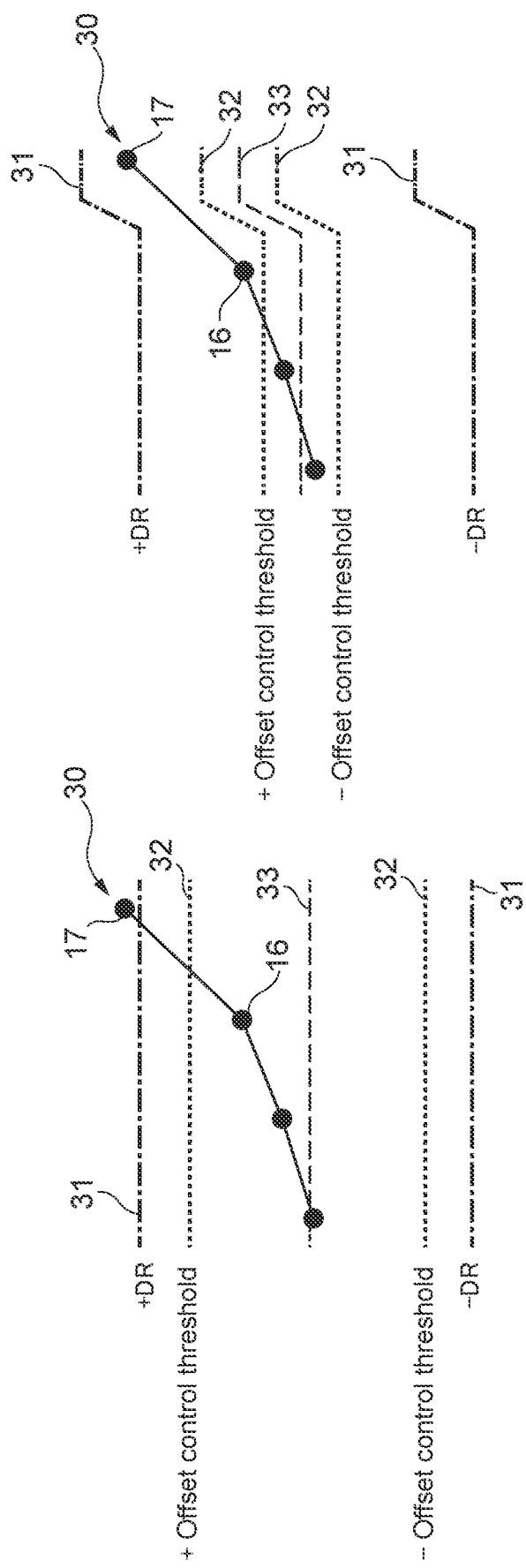

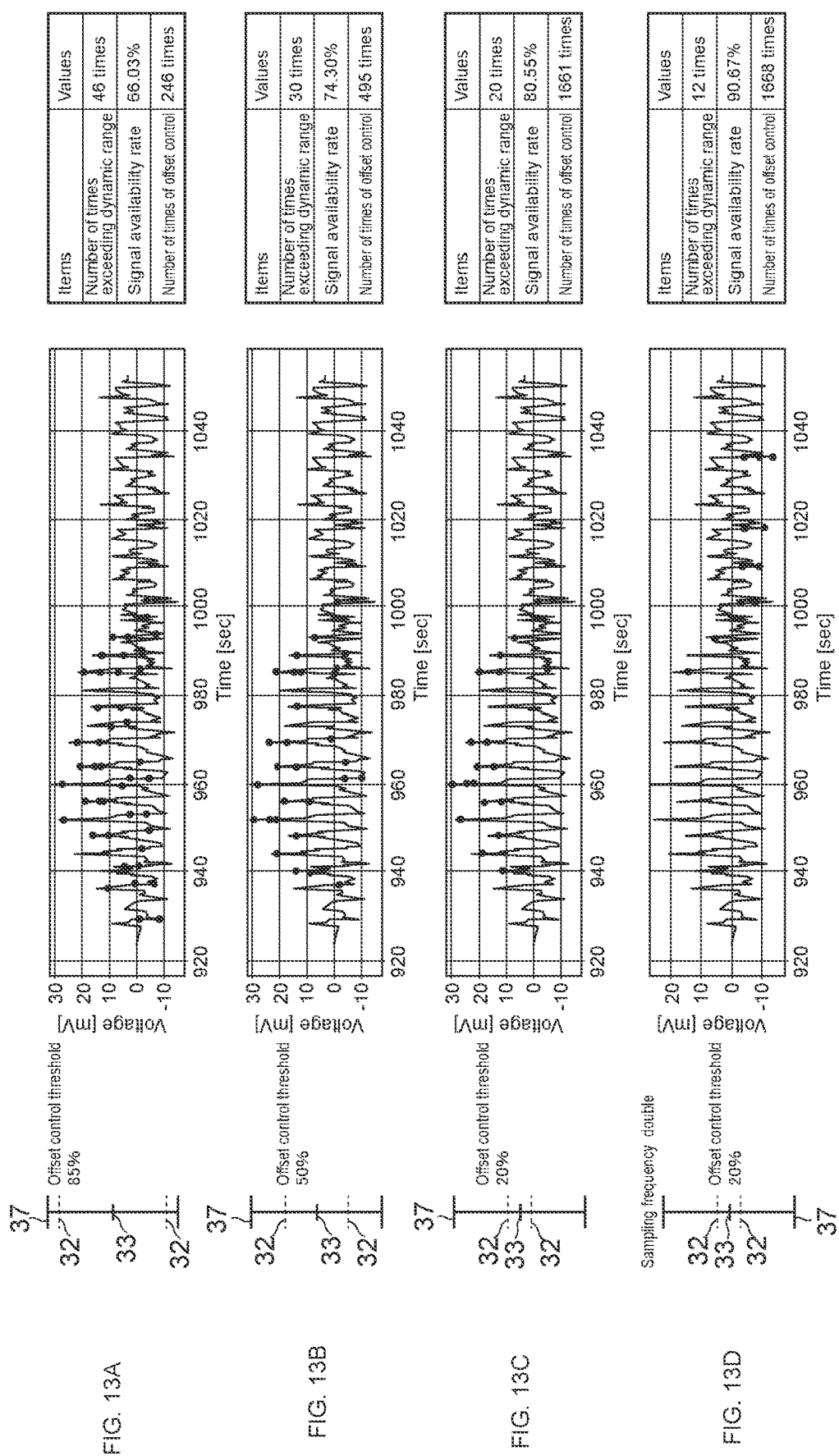

INFORMATION PROCESSING APPARATUS, BIOLOGICAL DATA MEASUREMENT SYSTEM, AND INFORMATION PROCESSING METHOD

CROSS REFERENCE TO RELATED APPLICATIONS

This application is a U.S. National Phase of International Patent Application No. PCT/JP2020/044589 filed on Dec. 1, 2020, which claims priority benefit of Japanese Patent Application No. JP 2019-222099 filed in the Japan Patent Office on Dec. 9, 2019. Each of the above-referenced applications is hereby incorporated herein by reference in its entirety.

TECHNICAL FIELD

The present technology relates to an information processing apparatus, a biological data measurement system, an information processing method, and a program that are used for a biological sensor to acquire biological data.

BACKGROUND ART

In measurement of biological data with a biological sensor, an analog detection biological signal detected by a bioelectrode attached to a person to be measured is digitized by an analog-to-digital converter. During measurement, body motion noise caused by the body motion of the person to be measured can be added to a detection biological signal. In some cases, the detection biological signal to which such body motion noise has been added is input into the analog-to-digital converter, exceeding an input valid range of the analog-to-digital converter, and biological data cannot be acquired during the occurrence of body motion.

Patent Literature 1 has disclosed a biological state detector that detects a pulse rate as biological data. This biological state detector determines whether a pulse wave signal exceeds the A/D input range after detecting the occurrence of body motion, adjusts the quantity of light and adjusts an offset by an amount corresponding to the light quantity adjustment in a case where the pulse wave signal exceeds the A/D input range, and then controls the pulse wave signal to be within the A/D input range by the offset follow-up.

CITATION LIST

Patent Literature

Patent Literature 1: Japanese Patent Application Laid-open No. 2013-208467

DISCLOSURE OF INVENTION

Technical Problem

The biological state detector of Patent Literature 1 is incapable of avoiding the case where the pulse wave signal exceeds the A/D input range because the biological state detector controls the pulse wave signal to be within the A/D input range after the pulse wave signal exceeds the A/D input range. Therefore, it is difficult to improve the accuracy of acquired biological data.

In view of the above-mentioned circumstances, it is an objective of the present technology to provide an information processing apparatus, a biological data measurement system, an information processing method, and a program that can improve the accuracy of acquired biological data.

Solution to Problem

In order to accomplish the above-mentioned objective, an information processing apparatus according to the present technology includes a body motion noise prediction unit and a control unit.

The body motion noise prediction unit predicts, on the basis of a reference signal that is body motion information of a person to be measured detected by a reference signal sensor, that body motion noise caused by body motion of the person to be measured is added to a detection biological signal detected by a biological sensor from the person to be measured.

The control unit controls signal processing of the detection biological signal on the basis of a prediction result of the body motion noise prediction unit.

In order to accomplish the above-mentioned objective, a biological data measurement system according to the present technology includes a reference signal sensor, a biological sensor, a body motion noise prediction unit, and a control unit.

The reference signal sensor detects a reference signal that is body motion information of a person to be measured.

The biological sensor detects a detection biological signal of the person to be measured.

The body motion noise prediction unit predicts, on the basis of the reference signal, that body motion noise is added to the detection biological signal.

The control unit controls signal processing of the detection biological signal on the basis of a prediction result of the body motion noise prediction unit.

In order to accomplish the above-mentioned objective, an information processing method according to the present technology includes:

predicting, on the basis of a reference signal that is body motion information of a person to be measured detected by a reference signal sensor, that body motion noise is added to a detection biological signal detected by a biological sensor from the person to be measured; and controlling signal processing of the detection biological signal on the basis of a result of predicting.

In order to accomplish the above-mentioned objective, a program according to the present technology causes an information processing apparatus to execute processing including: a step of predicting, on the basis of a reference signal that is body motion information of a person to be measured detected by a reference signal sensor, that body motion noise is added to a detection biological signal detected by a biological sensor from the person to be measured; and a step of controlling signal processing of the detection biological signal on the basis of a result of predicting.

BRIEF DESCRIPTION OF DRAWINGS

FIGS. 5A and 5B The image diagrams describing an offset control threshold change.

FIGS. 13A, 13B, 13C, and 13D The diagrams showing a change example of the number of times exceeding an input valid range of an analog-to-digital converter due to the offset control threshold change.

MODE(S) FOR CARRYING OUT THE INVENTION

When biological data is measured using a biological sensor, body motion noise caused by the body motion of a person to be measured may be added to a detection biological signal and the detection biological signal may vary suddenly. When a detection biological signal to which such body motion noise has been added is subjected to signal processing by an analog front-end circuit (hereinafter, referred to as AFE circuit) and input to an analog-to-digital converter (hereinafter, referred to as ADC), the detection biological signal exceeds an input valid range (hereinafter, sometimes referred to as dynamic range (DR)) of the ADC and biological data cannot be acquired during the occurrence of the body motion in some cases. The AFE circuit performs signal processing such as amplification processing and offset control of the detection biological signal.

The inventor of the present invention has found that body motion noise caused by the body motion appears in the detection biological signal detected by the biological sensor, delayed from a time at which the body motion of the person to be measured occurs, which can be read from a detection result of a reference signal sensor that detects body motion information of the person to be measured, and has completed the present technology.

That is, in the present technology, it is predicted in advance that body motion noise is added to a detection biological signal detected by a biological sensor on the basis of a detection result of the reference signal sensor and varies suddenly. The AFE circuit is controlled on the basis of the prediction result, and then the detection biological signal to which the body motion noise is predicted to be added is subjected to signal processing in the AFE circuit. More specifically, in a case where it is predicted that body motion noise is added to the detection biological signal, the detection biological signal is subjected to signal processing after changing at least one of an offset control threshold used in determining whether or not to activate the offset control, or a gain of the detection biological signal (hereinafter, sometimes referred to as amplification factor). Accordingly, the detection biological signal is offset-controlled using the changed offset control threshold or the detection biological signal is amplified with the changed gain. Accordingly, the detection biological signal subjected to the signal processing is prevented from exceeding the dynamic range. Accordingly, it becomes possible to increase the accuracy of biological data to be acquired even during the occurrence of the body motion.

Hereinafter, it will be described in detail.

Figure 1:
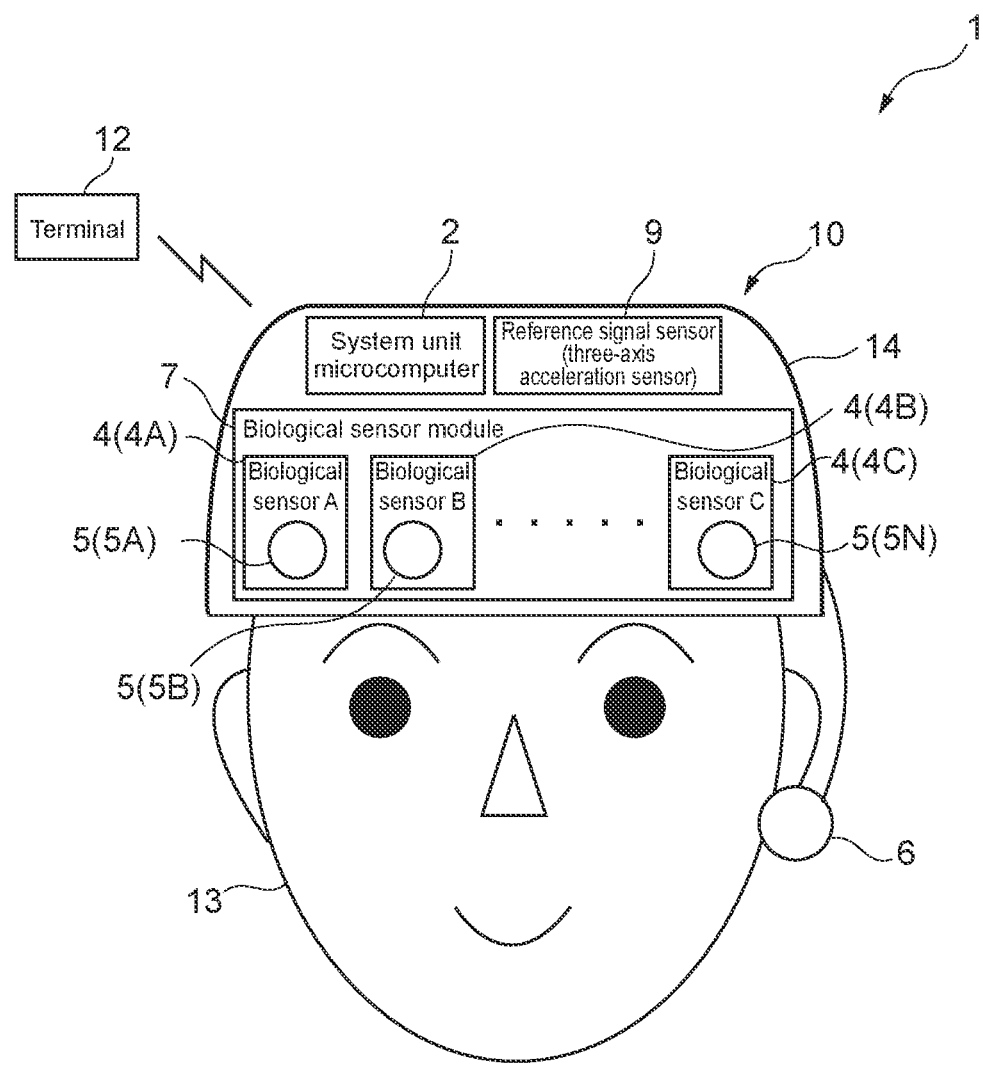
FIG. 1A schematic diagram of a biological data measurement system according to an embodiment of the present technology.

FIG. 1 is a schematic diagram of a biological data measurement system according to an embodiment of the present technology.

In a biological data measurement system 1, biological data of a person to be measured is acquired using a biological sensor. In this embodiment, an electroencephalogram (EEG) sensor that detects brainwaves is taken as an example of the biological sensor and a brainwave signal is measured as biological data.

In this specification, a biological signal before signal processing, which is detected from the person to be measured by the biological sensor, will be referred to as a detection biological signal. Moreover, a biological signal when the detection biological signal is subjected to signal processing by the AFE circuit and converted to digital form by the ADC will be referred to as an output biological signal. It should be noted that the output biological signal will be sometimes referred to as an A/D value or biological data.

[Schematic Configuration of Biological Data Measurement System]

As shown in FIG. 1, the biological data measurement system 1 includes a head fixing support 14, a biological sensor module 7, a system unit microcomputer 2, a reference signal sensor 9, and a terminal 12. The head fixing support 14, the biological sensor module 7, the system unit microcomputer 2, and the reference signal sensor 9 constitute a measurement device main body 10.

The head fixing support 14 supports the biological sensor module 7, the system unit microcomputer 2, and the reference signal sensor 9 and is configured to be wearable on the head of a person 13 to be measured. Bioelectrodes 5 of biological sensors 4 to be described later are fixed to the head fixing support 14 and are configured so that the bioelectrodes 5 are positioned at predetermined positions of the head when the person 13 to be measured wears it.

The biological sensor module 7 is an EEG sensor module in this embodiment.

The biological sensor module 7 includes a plurality of biological sensors (EEG sensors) 4A, 4B, . . . , 4N. The biological sensors 4A, 4B, . . . , 4N each have the same basic configuration, and will be referred to as biological sensors 4 unless they need to be distinguished from each other. The number of biological sensors is one or more.

The biological sensor 4 includes a bioelectrode 5, a reference electrode 6, a sensor control unit 41, a detection biological signal acquisition unit 42, an ADC 47, and an AFE circuit 48. The biological sensor module 7 has a plurality of bioelectrodes 5A, 5B, . . . , 5N and the biological sensors 4A, 4B, . . . , 4N are provided corresponding to the bioelectrodes 5A, 5B, . . . , 5N, respectively. The bioelectrodes 5A, 5B, . . . , 5N will be referred to as bioelectrodes 5 unless they need to be distinguished from each other.

The reference electrode 6 is configured to be wearable on, for example, an ear of the person 13 to be measured.

In the biological sensor module 7, one reference electrode 6 is provided and the plurality of biological sensors 4 shares the one reference electrode 6. The bioelectrode 5 as a detection unit is a detection electrode that acquires a biological signal of the person 13 to be measured. The bioelectrode 5 is a biological contact portion which is configured to be capable of being held in contact with a body site of the person 13 to be measured. When the head fixing support 14 is mounted, each of the bioelectrodes 5 comes into contact with different body sites of the head of the person 13 to be measured and acquires a biological signal of each of the body sites. A detection biological signal (detection brainwave signal) is detected on the basis of a potential difference between each bioelectrode 5 and the reference electrode 6.

The analog detection biological signal, which is the potential difference between the bioelectrodes 5 and the reference electrode 6, is subjected to signal processing by the AFE circuit 48, and thereafter, the analog detection biological signal is input to the ADC 47 and digitized to be the output biological signal. The output biological signal is transmitted to the system unit microcomputer 2.

The biological sensor 4 controls the AFE circuit 48 on the basis of an instruction received from the system unit microcomputer 2. The detection biological signal processed by the controlled AFE circuit 48 is input to the ADC 47 and digitized. The details of the biological sensor 4 will be described later.

The reference signal sensor 9 detects the body motion of the person 13 to be measured. In this embodiment, an example in which a three-axis acceleration sensor is used as the reference signal sensor will be shown. The three-axis acceleration sensor as the reference signal sensor 9 is mounted on the head of the person 13 to be measured via the head fixing support 14 and detects acceleration when the head moves. The body motion information of the person to be measured 13 detected by the reference signal sensor 9 will be referred to as a reference signal.

Based on the reference signal detected by the reference signal sensor 9, the system unit microcomputer 2 as an information processing apparatus predicts that body motion noise caused by the body motion of the person 13 to be measured appears in the detection biological signal detected by the biological sensor 4. Based on the prediction result, the system unit microcomputer 2 transmits an instruction for controlling the AFE circuit 48 of each biological sensor 4 to each biological sensor 4. Moreover, the system unit microcomputer 2 transmits the acquired reference signal and the output biological signal transmitted from each biological sensor 4 to the terminal 12. The details of the system unit microcomputer 2 will be described later.

The terminal 12 presents the output biological signal, which has been transmitted from the system unit microcomputer 2, to the user as biological data. Moreover, the terminal 12 presents the data regarding the reference signal, which has been transmitted from the system unit microcomputer 2, to the user as body motion information of the person 13 to be measured. The system unit microcomputer 2 and the terminal 12 are connected to each other with a wire or wirelessly.

[Details of Respective Configurations]

Figure 2:
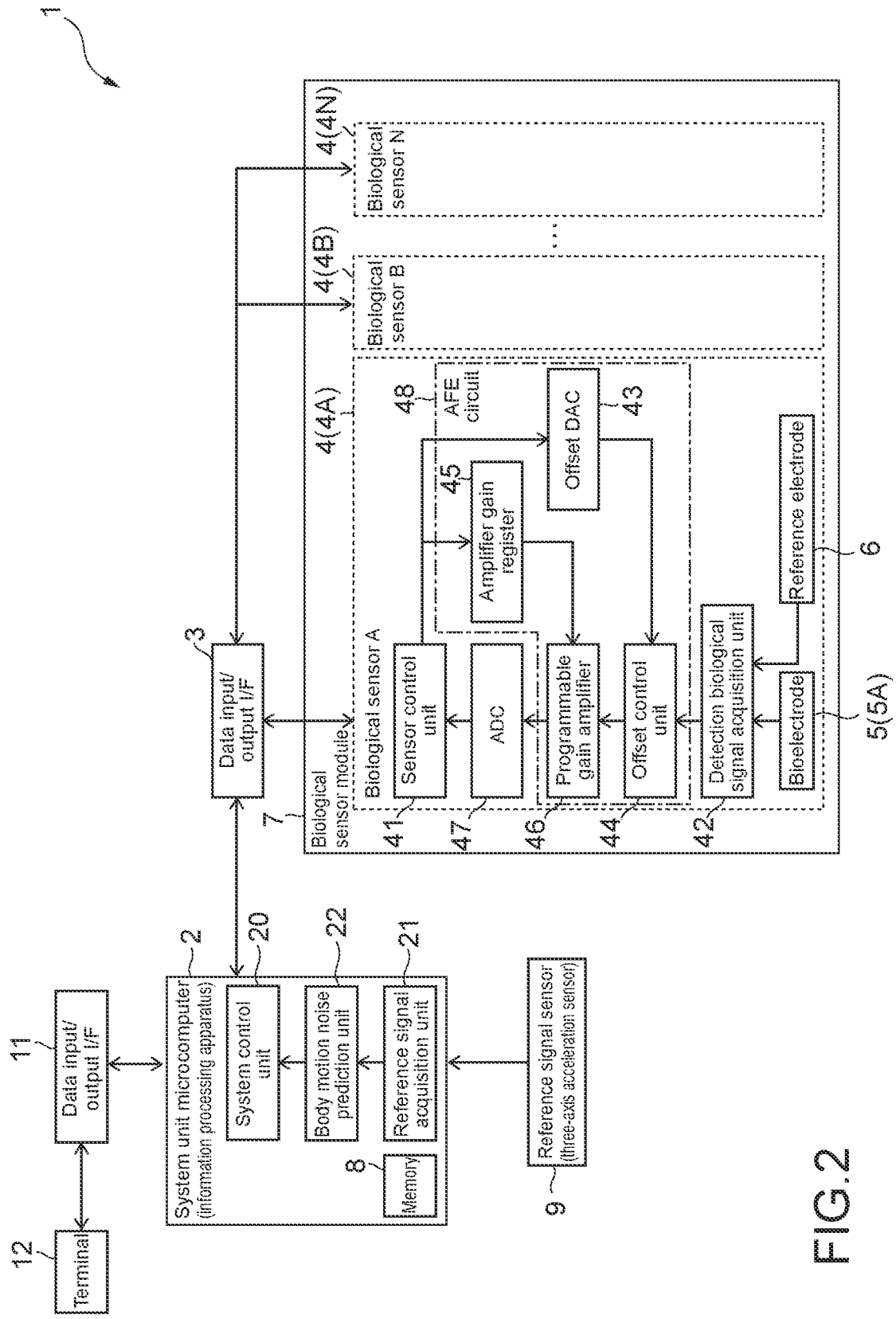
FIG. 2A block diagram showing a function configuration of the biological data measurement system.

FIG. 2 is a block diagram showing functional configurations of the biological data measurement system.

As shown in FIG. 2, the biological data measurement system 1 includes the system unit microcomputer 2, a data input/output interface (hereinafter, referred to as data input/output I/F) 3, the biological sensor module 7, the reference signal sensor 9, a data input/output interface (hereinafter, referred to as data input/output I/F) 11, and the terminal 12.

The data input/output I/F 3 is an I/F for inputting and outputting various data between the system unit microcomputer 2 and the biological sensor module 7.

The data input/output I/F 11 is an I/F for inputting and outputting various data between the system unit microcomputer 2 and the terminal 12. The communication between the system unit microcomputer 2 and the terminal 12 may be wired or wireless.

(Configuration of System Unit Microcomputer)

The system unit microcomputer 2 as the information processing apparatus includes a memory 8, a system control unit 20 as a control unit, a reference signal acquisition unit 21, and a body motion noise prediction unit 22.

A program stored in the memory 8 causes the system unit microcomputer 2 to perform processing including a step of predicting, on the basis of the reference signal that is the body motion information of the person to be measured detected by the reference signal sensor 9, that body motion noise is added to the detection biological signal detected from the person to be measured by the biological sensor 4, and a step of controlling the signal processing of the detection biological signal on the basis of the prediction result.

The reference signal acquisition unit 21 acquires the reference signal detected by the reference signal sensor 9.

Based on the acquired reference signal, the body motion noise prediction unit 22 predicts that the body motion noise caused by the body motion of the person 13 to be measured is added to the detection biological signal detected by the biological sensor 4 with a time delay from the time at which the body motion is detected by the reference signal sensor 9. In this embodiment, the body motion noise prediction unit 22 determines a body motion noise level on the basis of the reference signal as a prediction result.

The system control unit 20 transmits an instruction related to the control of the AFE circuit 48 of the biological sensor 4 to the biological sensor 4 on the basis of a prediction result of the body motion noise prediction unit 22, that is, the determined body motion noise level. The details of the instruction are set in association with the body motion noise level.

The determination as to the body motion noise level in the body motion noise prediction unit 22 described above is performed by determining a reference signal variation value by an operation using the acquired reference signal value and comparing the reference signal variation value with a threshold associated with the body motion noise level, which is prepared in advance. In this embodiment, the reference signal variation is an acceleration signal variation.

The reference signal variation value can be determined by using the following equation. That is, the reference signal variation is determined by taking a difference between the value at the present time and the value at the previous time with respect to each of the respective reference signals and the square root of the sum of the squares of the respective differences of the respective reference signals in the time domain.

[Formula 1]

Reference signal variation 1 =

-continued $$\sqrt{\begin{array}{c}(r1[t]-r1[t-1])^2+(r2[t]-r2[t-1])^2+\\ \ldots\ldots+(rN[t]-rN[t-1])\end{array}}$$

In the above-mentioned equation, N represents the number of types of reference signals. In this embodiment, since the example in which the three-axis acceleration sensor is used as the reference signal sensor is shown, three types of reference signals of X-axis acceleration, Y-axis acceleration, and Z-axis acceleration are obtained, so N=3.

In the above-mentioned equation, r1 denotes the X-axis acceleration, r2 denotes the Y-axis acceleration, r3 denotes the Z-axis acceleration. Moreover, the reference signal variation value calculated by the above-mentioned equation will be sometimes referred to as a reference signal variation value 1.

Moreover, although the example in which the reference signal variation is obtained by taking the square root is shown in the above-mentioned equation, the reference signal variation may be, as in the following equation, obtained by taking the sum of the squares of the respective differences of the respective reference signals without taking the square root. The reference signal variation value calculated by the following equation will be sometimes referred to as a reference signal variation value 2.

Reference signal variation $2=(r1[t]-r1[t-1])^2+(r2[t]-r2[t-1])^2+\ldots+(rN[t]-rN[t-1])^2$      [Formula 2]

The system unit microcomputer 2 manages two states of a "normal state" and an "offset/gain control state" as a control state. The default state is the "normal state".

The offset/gain control state is a state in which the body motion of the person 13 to be measured is detected on the basis of the reference signal and it is predicted that the body motion noise is added to the detection biological signal. In the offset/gain control state, the system unit microcomputer 2 instructs the biological sensor 4 to change the offset control threshold to be used when controlling the offset of the detection biological signal or to change the gain in the control of the AFE circuit 48.

The normal state is a state in which the person 13 to be measured is resting, a large body motion of the person 13 to be measured is not detected by the reference signal sensor 9, and it is predicted that a large body motion noise is not added to the detection biological signal. In the normal state, the instruction to change the offset control threshold and the instruction to change the gain are not performed in the control of the AFE circuit 48 of each biological sensor 4.

The operation of the biological data measurement system 1 in each state will be described later.

Specifically, the body motion noise level can be determined as follows, for example.

In a case where the reference signal variation value calculated by the above-mentioned equation is larger than a first threshold and equal to or smaller than a second threshold, it is defined as a body motion noise level A. In a case where the reference signal variation value is larger than the second threshold, it is defined as a body motion noise level B. The second threshold is a value larger than the first threshold. Moreover, in a case where the reference signal variation value is equal to or smaller than the first threshold, it is defined as a body motion noise level C.

In this embodiment, the description will be given assuming that the first threshold to be compared with the reference signal variation value (reference signal variation value 1) calculated by using the equation of the square root of the sum of the squares of the respective differences of the respective reference signals described above is 0.07 G and the second threshold is 1G, though the numerical values are not limited thereto.

The body motion noise level A and the body motion noise level B correspond to the offset/gain control state. The body motion noise level C corresponds to the normal state.

In a case where the calculated reference signal variation value is larger than 0.07 G and equal to or smaller than 1 G, the system unit microcomputer 2 determines it as the body motion noise level A, and transmits to the biological sensor 4 an instruction to set the offset control threshold to a value different from that in the normal state. More specifically, the system unit microcomputer 2 transmits an instruction to narrow the range of the offset control threshold by making the offset control threshold closer to the center of the dynamic range.

In a case where the calculated reference signal variation value is larger than 1G, the system unit microcomputer 2 determines it as the body motion noise level B, and transmits to the biological sensor 4 an instruction to set the gain to a value different from that of the normal value. More specifically, the system unit microcomputer 2 transmits an instruction to lower the gain.

In a case where the calculated reference signal variation value is equal to or smaller than 0.07 G, the system unit microcomputer 2 determines it as the body motion noise level C. The system unit microcomputer 2 does not instruct the biological sensor 4 to change the offset control threshold and the gain in a case where it is currently in the normal state.

Moreover, the system unit microcomputer 2 starts a timer of 500 msec at the same time as shifting from the normal state to the offset/gain control state. Then, after the expiration of the timer of 500 msec, the system unit microcomputer 2 transmits to the biological sensor 4 a restoration instruction to return the changed offset control threshold or gain to that in the normal state (hereinafter, sometimes referred to as offset/gain restoration instruction). Thus, in this embodiment, the period of being in the offset/gain control state is adjusted by setting the timer. The details will be described later.

Moreover, the system unit microcomputer 2 receives the output biological signal output from each of the biological sensors 4 of the biological sensor module 7 and outputs the output biological signal to the terminal 12 via the data input/output I/F 11. The system unit microcomputer 2 outputs the data regarding the acquired reference signal to the terminal 12 via the data input/output I/F 11.

In the present technology, the calculation of the change value of the reference signal used for the body motion noise occurrence prediction is not complicated because the two-point difference in the time domain is merely used, and real-timeness of the body motion noise occurrence prediction by the calculation is ensured.

(Configuration of Biological Sensor)

The biological sensor 4 performs signal processing on the detection biological signal, which is the potential difference between the bioelectrode 5 and the reference electrode 6, converts it to digital form, and outputs the output biological signal. The biological sensor 4 controls the AFE circuit 48 on the basis of an instruction transmitted from the system unit microcomputer 2. In the biological sensor 4, the detection biological signal is subjected to signal processing by the controlled AFE circuit 48, digitized, and output as the output biological signal.

The biological sensor 4 manages two states of a "normal state" and an "offset/gain control state" like the system unit microcomputer 2. The default state is the "normal state".

As shown in FIG. 2, the biological sensor 4 includes the bioelectrode 5, the reference electrode 6, the sensor control unit 41, which is an MC of the sensor unit, the detection biological signal acquisition unit 42, an offset digital-to-analog converter (hereinafter, referred to as offset DAC) 43, an offset control unit 44, an amplifier gain register 45, a programmable gain amplifier 46, and the ADC 47.

The offset DAC 43, the offset control unit 44, the amplifier gain register 45, and the programmable gain amplifier 46 constitute the AFE circuit 48.

The detection biological signal acquisition unit 42 acquires a potential difference (detection biological signal) between the bioelectrode 5 and the reference electrode 6.

The ADC 47 converts the detection biological signal, which is analog waveform data offset-controlled and gain-adjusted by the AFE circuit 48, to digital form. In this embodiment, for example, a low-bit 14-bit ADC can be used, which can reduce the size and power consumption of the biological sensor 4. In a case where the signal resolution is increased with a low bit ADC such as 14-bit, the dynamic range is reduced, but since the offset control can offset the dynamic range, it is possible to widen the range in which the detection biological signal can be acquired to the range in which the offset can be controlled.

The sensor control unit 41 controls the AFE circuit 48 on the basis of an instruction transmitted from the system unit microcomputer 2.

When the sensor control unit 41 receives from the system unit microcomputer 2 an instruction to make the range of the offset control threshold different from that in the normal state, more specifically, narrow the offset control threshold, the sensor control unit 41 takes the offset/gain control state. The sensor control unit 41 updates the threshold to narrow the range of the offset control threshold. The sensor control unit 41 adjusts the offset amount by using the offset DAC 43 in a case where the A/D value obtained by performing signal processing on the detection biological signal and converting it to digital form exceeds the offset control thresholds in the two states of the normal state and the offset/gain control state.

When the sensor control unit 41 receives from the system unit microcomputer 2 an instruction to make the gain different from that in the normal state, more specifically, lower the gain, the sensor control unit 41 takes the offset/gain control state. The sensor control unit 41 causes the amplifier gain register 45 of the AFE circuit 48 to set to reduce the amplification factor of the programmable gain amplifier 46.

When the sensor control unit 41 receives the offset/gain restoration instruction from the system unit microcomputer 2, the sensor control unit 41 shifts to the normal state and controls the AFE circuit 48 to return the changed offset control threshold or gain to that in the normal state.

The analog detection biological signal processed by the AFE circuit 48 is converted by the ADC 47 into a digital output biological signal. The sensor control unit 41 transmits the output biological signal to the system unit microcomputer 2 via the data input/output I/F 3.

The offset DAC 43 adjusts the offset amount in the offset control.

The offset control unit 44 is intended to enable the offset amount to be programmably adjusted. The offset control unit 44 offsets the detection biological signal on the basis of the offset amount set by the offset DAC 43.

The amplifier gain register 45 sets the gain (amplification factor) of the programmable gain amplifier 46 in accordance with an instruction from the sensor control unit 41.

The programmable gain amplifier 46 adjusts and amplifies the gain of the offset-controlled detection biological signal by using the gain set by the amplifier gain register 45. Accordingly, it is possible to make the dynamic range width variable.

As described above, in the biological sensor 4, the signal processing of the detection biological signal is controlled on the basis of the instruction to change the offset control threshold or the gain, which is based on the body motion noise predicted by the system unit microcomputer 2.

[Operation Description of System Unit Microcomputer and Biological Sensor]
(Offset Control)

Figure 3:
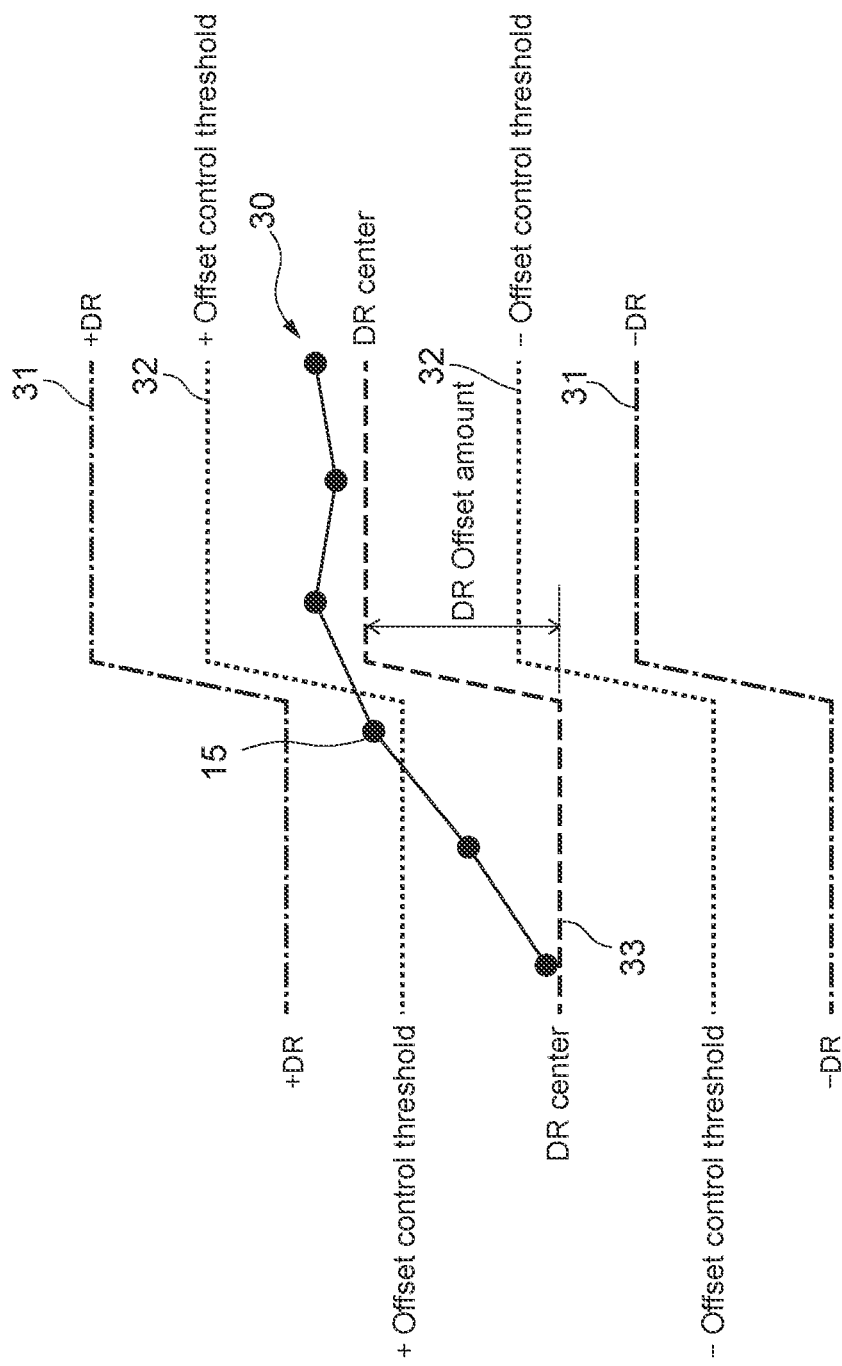
FIG. 3 An image diagram for describing offset control in a normal state.

Next, the offset control will be described. FIG. 3 is an image diagram for describing the offset control in the normal state. In FIG. 3, a line graph 30 shows an example of a change over time of an A/D value obtained by performing signal processing on a detection biological signal of a sample and converting it to digital form. The horizontal direction indicates the time axis and the vertical axis indicates the A/D value. Two long-dashed short-dashed lines 31 and 31 indicate the dynamic range in ADC 47. A broken line 33 with longer lines indicates the center of the dynamic range. Two broken lines 32 and 32 with shorter lines indicate the range of the offset control threshold.

The sensor control unit 41 sequentially samples the A/D value and compares the A/D value with the offset control threshold. In a case where the A/D value exceeds the offset control threshold as a result of the comparison, the dynamic range is offset so that the A/D value when exceeding is the center of the dynamic range indicated by the broken line 33 as shown in FIG. 3. The offset amount at this time is used to perform the offset control of the detection biological signal. In the example shown in FIG. 3, at the time of the point 15 plotted, the A/D value exceeds the offset control threshold, so the dynamic range is offset so that the point 15 is the center of the dynamic range.

Thus, the range of the offset control threshold is set to a range narrower than the dynamic range. By the offset control to offset the detection biological signal in a case where the offset control threshold is exceeded, the event that the A/D value exceeds the dynamic range of the ADC 47 can be avoided, and the accuracy of the acquired biological data can be improved.

Here, in a case where a large body motion of the person 13 to be measured has not occurred, there is no sudden variation in the biological signal, and therefore the dynamic range is not exceeded at the time at which the offset control threshold is exceeded.

In the signal processing at the AFE circuit 48 in the normal state, the detection biological signal is amplified with a predetermined gain in addition to the offset control described above.

(Operation in Offset/Gain Control State)

When the biological sensor 4 receives from the system unit microcomputer 2 the offset control threshold change instruction or the gain change instruction, the biological sensor 4 shifts from the normal state to the offset/gain control state.

Figure 4:
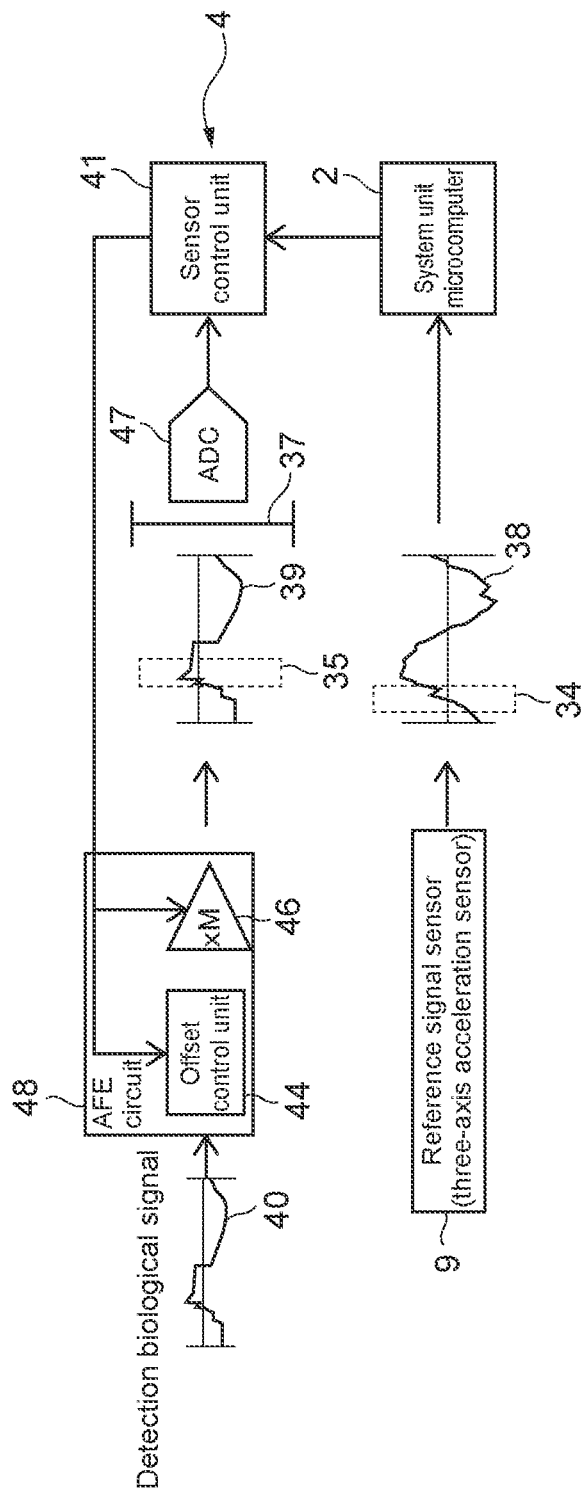
FIG. 4 A schematic diagram describing an operation in an offset/gain control state in the biological data measurement system.

FIG. 4 is a schematic diagram describing the overview of the operation of the biological data measurement system 1 in the offset/gain control state.

As shown in FIG. 4, a reference signal 38 detected by the reference signal sensor 9 is input to the system unit microcomputer 2. In the example shown in FIG. 4, a sudden variation caused by the body motion of the person to be measured 13 appears in a portion surrounded by a broken-line rectangle 34 of the reference signal 38.

Based on the input reference signal 38, the system unit microcomputer 2 predicts that body motion noise caused by the body motion of the person 13 to be measured is added to the detection biological signal detected by each biological sensor 4. In this embodiment, the body motion noise level is determined as the body motion noise prediction result by using the above-mentioned equation. The system unit microcomputer 2 transmits an instruction related to the signal processing associated with the determined body motion noise level to the sensor control unit 41.

Specifically, in the case of the body motion noise level A, the system unit microcomputer 2 transmits an instruction to make the offset control threshold narrower than that in the normal state to the sensor control unit 41 of the biological sensor 4.

In the case of the body motion noise level B, the system unit microcomputer 2 transmits an instruction to lower the gain to the sensor control unit 41. In the case of the body motion noise level C, the system unit microcomputer 2 does not instruct to change the offset control threshold and the gain.

When the sensor control unit 41 receives from the system unit microcomputer 2 an instruction to change the offset control threshold or the gain, the biological sensor 4 shifts from the normal state to the offset/gain control state.

The sensor control unit 41 controls the AFE circuit 48 in accordance with an instruction from the system unit microcomputer 2.

More specifically, the sensor control unit 41 changes the offset control threshold on the basis of the change instruction to narrow the offset control threshold, and controls the AFE circuit 48 to perform the offset control by using the changed offset control threshold. In this case, in the AFE circuit 48, the detection biological signal is amplified with the gain set in the normal state.

The sensor control unit 41 changes the gain on the basis of the change instruction to lower the gain, and controls the AFE circuit 48 to perform the signal processing with the changed gain. In this case, in the AFE circuit 48, the detection biological signal is offset-controlled on the basis of the offset control threshold set in the normal state.

As shown in FIG. 4, a detection biological signal 40 detected by the biological sensor 4 is subjected to signal processing by the AFE circuit 48 on the basis of the set offset control threshold and gain. Accordingly, as shown in FIG. 4, body motion noise appears in a portion surrounded by the broken-line rectangle 35, but the processed detection biological signal 39 subjected to signal processing by the AFE circuit 48 can be kept within a dynamic range 37 of the ADC 47. The detection biological signal 39 input to the ADC 47 is converted by the ADC 47 to digital form and output to the sensor control unit 41.

(Change of Offset Control Threshold)

The change of the offset control threshold will be described.

When the sensor control unit 41 receives a change instruction of the offset control threshold from the system unit microcomputer 2, the sensor control unit 41 updates the threshold to narrow the range of the offset control threshold.

FIGS. 5A and 5B are image diagrams describing the offset control when body motion occurs. FIG. 5A is a diagram in a case of not changing the offset control threshold and FIG. 5B is a diagram in a case of changing the offset control threshold on the basis of the predicted body motion noise according to the present technology.

In FIGS. 5A and 5B, a line graph 30 shows a change over time an A/D value of a sample. Two long-dashed short-dashed lines 31 and 31 indicate the dynamic range of the ADC 47. Two broken lines 32 and 32 indicate the range of the offset control threshold.

As described above with reference to FIG. 3, the offset control is also performed in the normal state. In the normal state, there is no sudden variation in the A/D value, and therefore the dynamic range is not exceeded at the time at which the A/D value exceeds the range of the offset control threshold, and also in a case where the offset control is performed using the time at which the A/D value exceeds the offset control threshold as the base, the A/D value is prevented from exceeding the dynamic range. Thus, in the normal state with no body motions, the offset control prevents the A/D value from exceeding the dynamic range.

On the other hand, in a case where body motion noise is added causing a sudden variation in the A/D value due to the occurrence of body motion, as in a point 17 of the line graph 30 shown in FIG. 5A, the dynamic range may be exceeded at the time at which the range of the offset control threshold is exceeded. In this case, even in a case where the offset control is performed using the time at which the offset control threshold is exceeded as the base, there is a part that has already exceeded the dynamic range, and therefore biological data regarding the part cannot be acquired.

On the other hand, in this embodiment, since it can be predicted in advance that body motion noise is added to the detection biological signal on the basis of the reference signal, an instruction to change the range of the offset control threshold is provided in a case where it is predicted that body motion noise is added.

Specifically, as shown in FIG. 5B, an instruction is provided to make the range of the offset control threshold narrower than that in the normal state to make the offset control threshold closer to the center of the dynamic range.

As shown in FIG. 5A, in a case where the offset control threshold is not changed, the offset control threshold is set so that the +offset control threshold (−offset control threshold) is located at the position of, for example, 85% from the center of the dynamic range as the range from the center of the dynamic range indicated by the broken line 33 to +DR (−DR) is defined as 100%.

On the other hand, as shown in FIG. 5B, in a case where the offset control threshold is changed, the offset control threshold is set so that the +offset control threshold (−offset control threshold) is located at the position of, for example, 20% from the center of the dynamic range as the range from the center of the dynamic range to +DR (−DR) is defined as 100%.

As described above, in this embodiment, the offset control threshold is set to 85% in the normal state and is set to 20% in the offset/gain control state.

As shown in FIG. 5B, the offset control threshold is exceeded at the time of a point 16 preceding the point 17 by changing the range of the offset control threshold changed to be narrower, and therefore the offset control is performed so that the detection biological signal of the sample at the point 16 is the center of the dynamic range. As shown in FIG. 5B, the point 16 does not exceed the dynamic range. This reduces the risk that the A/D value of the sample at the next point 17 will exceed the dynamic range.

In this manner, before the body motion noise appears in the detection biological signal, the offset control threshold is changed to be closer to the center of the dynamic range, to thereby increase the activation rate of the offset control. Accordingly, even in a case where body motion noise is added and there is a sudden variation in the detection biological signal, the possibility that the detection biological signal after the signal processing departs from the dynamic range can be reduced. Therefore, the accuracy of the acquired biological data can be improved.

The offset/gain control state continues from the time at which the offset control threshold is changed to the time after 500 msec has elapsed. A setting is made such that when the offset/gain control state shifts to the normal state after 500 msec has elapsed, the range of the offset control threshold is wider than that in the offset/gain control state.
(Gain Change)

The gain change will be described.

When the sensor control unit 41 receives the gain change instruction from the system unit microcomputer 2, the sensor control unit 41 shifts to the offset/gain control state from the normal state and controls the AFE circuit 48 to lower the gain (programmable gain).

Figure 6A:
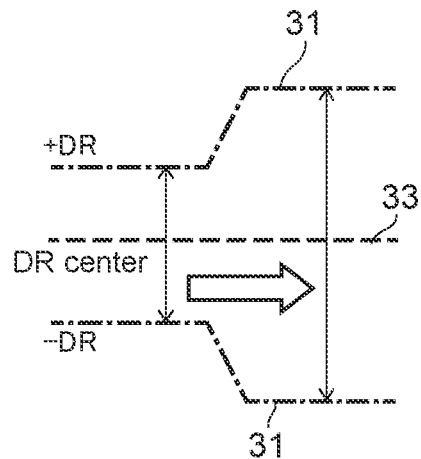
FIGS. 6A, 6B, and 6C The image diagrams describing a gain change.

FIG. 6A is an image diagram showing an example of shifting to the offset/gain control state from the normal state and lowering the gain.

Figure 6B:
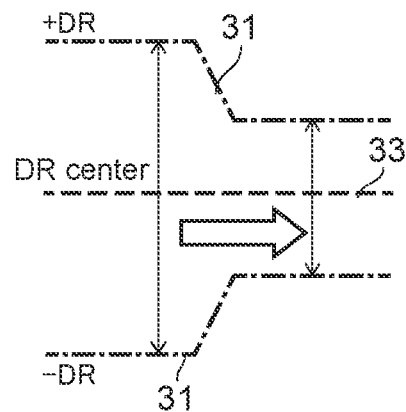

FIG. 6B is an image diagram showing an example of shifting to the normal state from the offset/gain control state and restoring the gain, i.e., increasing the gain.

Figure 6C:
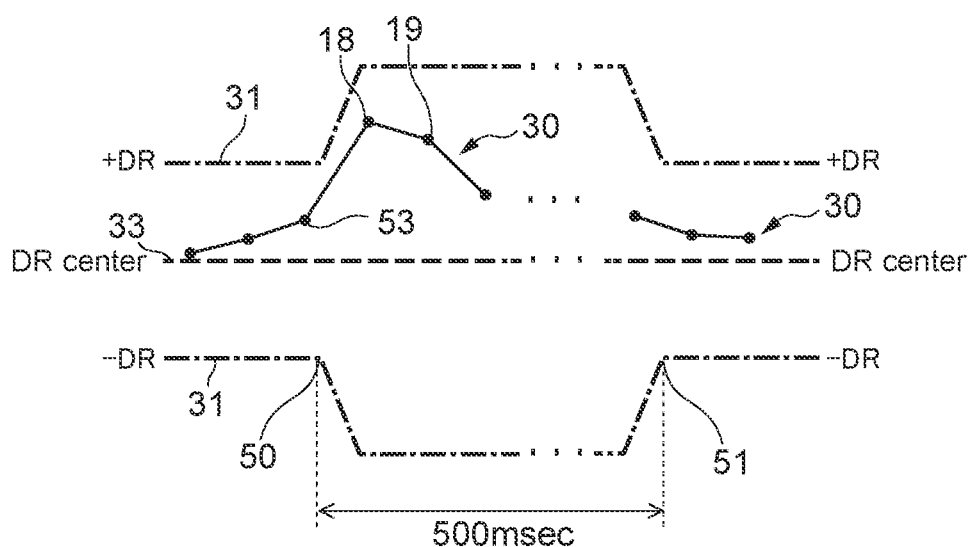

FIG. 6C is an image diagram describing an operation in the biological sensor 4 in this embodiment. FIG. 6C shows an example in which it is predicted that body motion noise is added, the gain is changed, the normal state shifts to the offset/gain control state, and then the offset/gain control state shifts to the normal state after 500 msec has elapsed after the shift to the offset/gain control state. A line graph 30 shows a change over time an A/D value of a sample.

As shown in FIGS. 6A and 6C, when the gain (amplification factor) is lowered, the detection biological signal less amplified is input to the ADC 47. Therefore, the detection biological signal is input with a margin with respect to the dynamic range of the ADC 47, and the dynamic range is extended. Accordingly, even in a case where body motion noise is added and there is a sudden variation in the detection biological signal, the detection biological signal can be prevented from departing from the dynamic range of the ADC 47. In the example shown in FIG. 6C, body motion noise is included in samples at points 18 and 19. In this embodiment, since it is possible to predict in advance that the body motion noise is added to the detection biological signal on the basis of the reference signal, it is possible to change the gain at the time of a point 53 preceding the point 18, that is, at the time before the body motion noise appears in the detection biological signal. Accordingly, the detection biological signal can be prevented from departing from the dynamic range of the ADC 47 at the times of the points 18 and 19.

As shown in FIG. 6C, the offset/gain control state continues from a time 50 at which the gain is changed to a time 51 after 500 msec has elapsed. A setting is made such that when the offset/gain control state shifts to the normal state after 500 msec has elapsed as shown in FIGS. 6B and 6C, the gain is higher than that in the offset/gain control state. Accordingly, the amplification factor of the detection biological signal is higher and the dynamic range is smaller than that in the offset/gain control state.

As described above, lowering the gain can prevent the detection biological signal from departing from the dynamic range.
(Offset Control Threshold Change and Gain Change)

In this embodiment, an example of performing the gain change in a case where the body motion is large and performing the offset control threshold change in a case where the body motion is small is shown.

This is because the biological signal resolution lowers in the gain change of lowering the programmable gain, and in this embodiment, the gain change is configured to be performed only in a case where it is predicted that the offset control threshold change cannot cope with the body motion noise.

For example, in a case where a 14-bit ADC is used as the ADC 47, when the dynamic range is extended by lowering the gain as shown in FIG. 6A, this range is expressed by the 14-bit ADC and the signal resolution per least significant bit (LSB) lowers. On the other hand, when the dynamic range is reduced by increasing the gain as shown in FIG. 6B, this range is expressed by the 14-bit ADC and the signal resolution per LSB increases. Therefore, in this embodiment, the gain change is configured to be performed only in a case where it is predicted that it is the body motion noise with which the offset control threshold change cannot cope.

As described above, in this embodiment, on the basis of the reference signal detected by the reference signal sensor 9, it is possible to predict in advance that body motion noise is added to the detection biological signal detected by the biological sensor 4. Therefore, the detection biological signal in which the body motion noise appears can be input to the ADC 47 after it is subjected to signal processing with the offset control threshold and the amplification factor set in advance on the basis of the body motion noise level. This makes it easier to prevent the detection biological signal after the signal processing from departing from the dynamic range of the ADC 47. Therefore, the accuracy of the acquired biological data can be improved.
(Timer and Shift from Offset/Gain Control State to Normal State)

As described above, the body motion noise caused by the body motion appears in the detection biological signal detected by the biological sensor, delayed from the time at which the body motion of the person to be measured occurs, which can be read from the reference signal. In this embodiment, this delay is estimated to be at most 400 msec. In the biological data measurement system 1, it is predicted that the detection biological signal varies suddenly during the period of 500 msec with some time margin after the body motion noise prediction unit 22 detects that the threshold associated with the body motion noise level is exceeded, and the timer is set to 500 msec. After 500 msec has elapsed from the shift to the offset/gain control state, the system unit microcomputer 2 transmits an instruction to restore the normal state to the biological sensor 4. The instruction to restore the normal state is an offset control threshold restoration instruction to return the offset control threshold to the offset control threshold in the normal state or a gain restoration instruction to return the gain to the gain in the normal state. Hereinafter, the description will be given with reference to FIG. 7.

Figure 7:
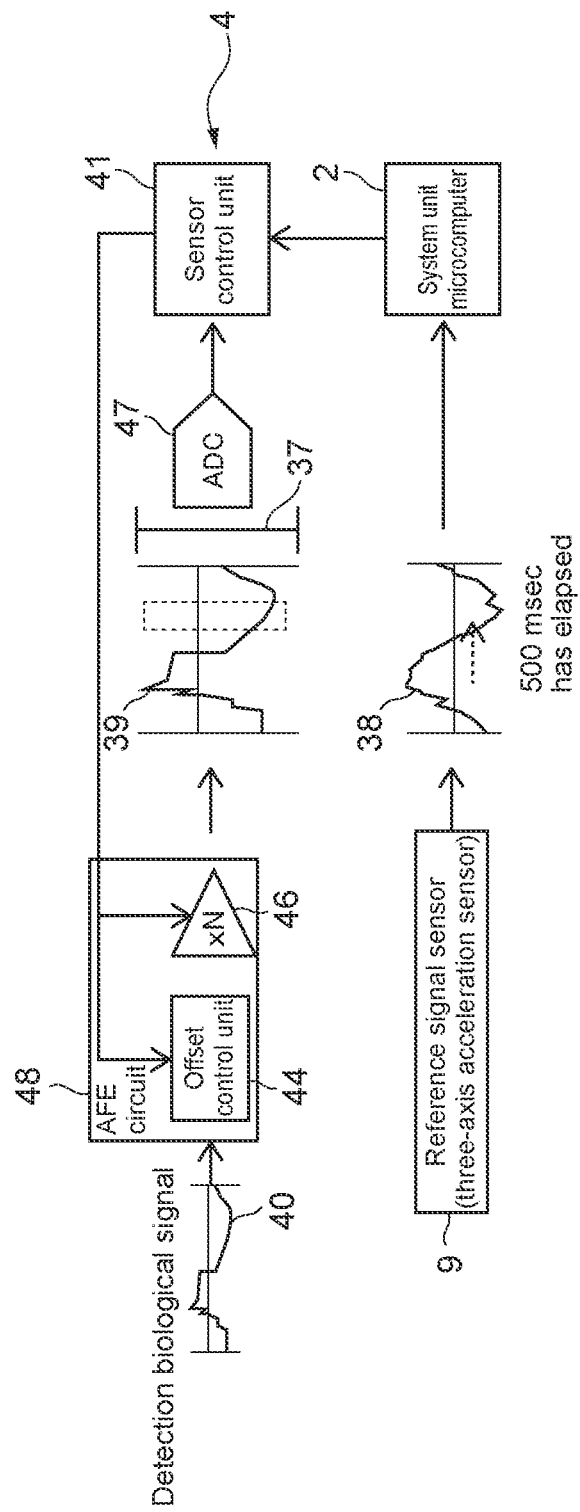
FIG. 7 A schematic diagram describing an operation when restoring the normal state from the offset/gain control state in the biological data measurement system.

FIG. 7 is a schematic diagram describing the overview of the operation of the biological data measurement system 1 when shifting from the offset/gain control state to the normal state.

As shown in FIG. 7, the reference signal 38 detected by the reference signal sensor 9 is input to the system unit microcomputer 2. The system unit microcomputer 2 starts the timer of 500 msec at the same time the system unit microcomputer 2 shifts to the offset/gain control state. When the system unit microcomputer 2 detects that 500 msec of the timer has elapsed, the system unit microcomputer 2 transmits to the sensor control unit 41 the offset control threshold restoration instruction or the gain restoration instruction.

After the sensor control unit 41 receives the offset control threshold restoration instruction or the gain restoration instruction, the sensor control unit 41 shifts to the normal state. The sensor control unit 41 controls the AFE circuit 48 in accordance with an instruction from the system unit microcomputer 2. More specifically, the sensor control unit 41 controls the AFE circuit 48 to return the offset control threshold to the original value or to return the gain to the original value.

The detection biological signal 40 detected by the biological sensor 4 is subjected to signal processing by the AFE circuit 48 on the basis of the set offset control threshold and gain, converted by the ADC 47 to digital form, and output to the sensor control unit 41.

In this manner, by providing the restoration instruction to return to the normal state after the predetermined time has elapsed from the shift to the offset/gain control state, it is possible to suppress an increase in power consumption and to avoid the deterioration of the biological signal resolution.

That is, providing the timer can adjust the period of the offset/gain control state, and can make an adjustment so that the offset control threshold change and the gain change are performed mainly in a situation where body motion noise is added to the detection biological signal. Accordingly, although the offset control is frequently performed by changes to narrow the offset control threshold, which increases the power consumption, providing the timer can limit the period in which the power consumption is increased, and can suppress an increase in power consumption in a period predicted that there is no body motion noise. Moreover, although the biological signal resolution deteriorates due to the change to lower the gain, providing the timer can limit the period in which the biological signal resolution deteriorates, and can avoid the deterioration of the biological signal resolution in the period predicted that there is no body motion noise.

After the system unit microcomputer 2 transmits the instruction to restore the offset control threshold or the instruction to restore the gain to the biological sensor 4, the system unit microcomputer 2 shifts to the normal state and restarts the observation of the reference signal variation by the body motion noise prediction unit 22.

The observation of the reference signal variation also continues during the period of the offset/gain control state, and if a reference signal variation exceeding the threshold is observed during the period of the offset/gain control state, the timer of 500 msec is newly restarted then.

After the biological sensor 4 receives the offset control threshold restoration instruction or the gain restoration instruction, the biological sensor 4 shifts to the normal state, returns the offset control threshold to the original value or returns the programmable gain to the original value, and performs the acquisition, signal processing, and digital conversion processing of the detection biological signal again.

[Information Processing Method]
(Flow of Processing in Biological Data Measurement System)

Figure 8:
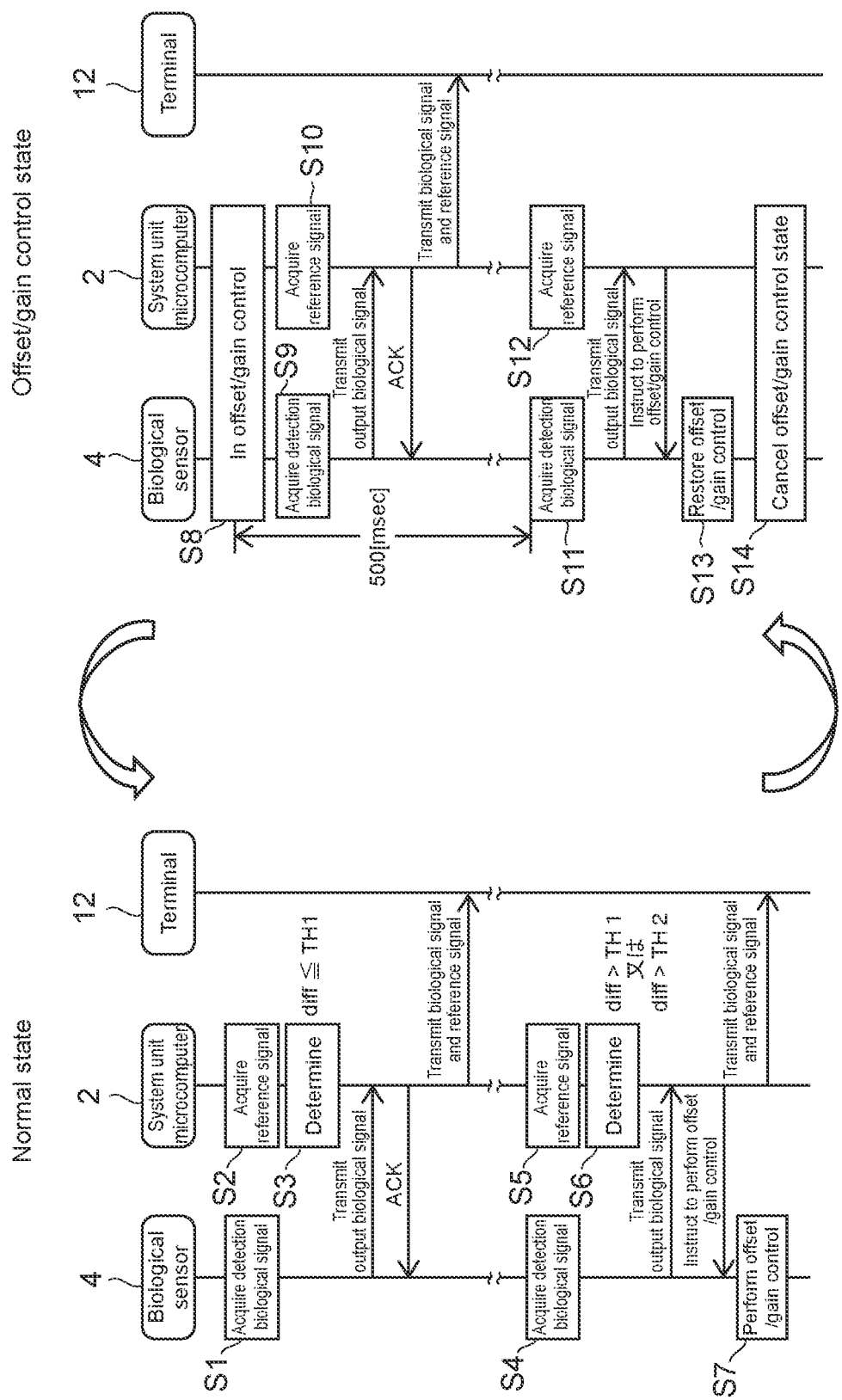
FIG. 8 A sequence diagram showing the exchange between a biological sensor, a system unit microcomputer, and a terminal in the biological data measurement system.

FIG. 8 is a sequence diagram showing the exchange between the biological sensor 4, the system unit microcomputer 2, and the terminal 12 in the biological data measurement system 1.

In FIG. 8, the left side of the white arrows as a boundary shows a sequence diagram in the normal state and the right side shows a sequence diagram in the offset/gain control state.

The white arrows indicate shifts to the different states. In the sequence diagram of the normal state on the left side of the figure, the upper side indicates an operation in a case where the reference signal variation value is equal to or smaller than the first threshold in the determination as to the body motion noise level and the lower side indicates an operation in a case where the reference signal variation value is larger than the first threshold or the second threshold. In the sequence diagram of the offset/gain control state on the right side of the figure, the upper side indicates an operation performed until 500 msec elapses after the shift to the offset/gain control state and the lower side indicates an operation performed after 500 msec elapses after the shift to the offset/gain control state.

As shown in the upper diagram of the sequence diagram in the normal state of FIG. 8, the biological sensor 4 acquires a detection biological signal (S1). The biological sensor 4 performs signal processing on the acquired detection biological signal and converts it into a digital output biological signal (biological data), and transmits the output biological signal (biological data) to the system unit microcomputer 2.

The system unit microcomputer 2 acquires a reference signal (S2), and compares the reference signal variation value with the threshold associated with the body motion noise level by using the reference signal to thereby determine the body motion noise level (S3). Here, the reference signal variation value (diff) is equal to or smaller than the first threshold (TH1), and therefore it is determined that it is the body motion noise level C, i.e., the normal state. In the normal state, the system unit microcomputer 2 gives a receipt acknowledgement (ACK) to the biological sensor 4 when the system unit microcomputer 2 receives the output biological signal from the biological sensor 4.

The system unit microcomputer 2 transmits the output biological signal and the reference signal to the terminal 12.

Thus, a variation of the reference signal is determined by the system unit microcomputer 2, and in a case where the reference signal variation value is equal to or smaller than the first threshold, the instruction of the offset control threshold change and the gain change is not provided.

As shown in the lower diagram of the sequence diagram in the normal state in FIG. 8, the biological sensor 4 acquires a detection biological signal (S4). The biological sensor 4 performs signal processing on the acquired detection biological signal and converts it into a digital output biological signal (biological data), and transmits the output biological signal (biological data) to the system unit microcomputer 2.

The system unit microcomputer 2 acquires a reference signal (S5), and compares the reference signal variation value with the threshold associated with the body motion noise level by using the reference signal to thereby determine the body motion noise level (S6). Here, the reference signal variation value (diff) is larger than the first threshold (TH1) or the second threshold (TH2), and therefore it is determined that it is the body motion noise level A or B, i.e., the offset/gain control state. In the offset/gain control state, the system unit microcomputer 2 transmits to the biological sensor 4 an instruction to change the offset control threshold or the gain when the system unit microcomputer 2 receives the output biological signal.

Based on the instruction, the biological sensor 4 shifts to the offset/gain control state and changes the offset control threshold or the gain (S7).

The system unit microcomputer 2 transmits an output biological signal and a reference signal to the terminal 12. After the shift to the offset/gain control state, processing is performed following the sequence diagram on the right side of FIG. 8.

Thus, the variation of the reference signal is determined by the system unit microcomputer 2, and in a case where the reference signal variation value is larger than the first threshold or the second threshold, the instruction of the offset control threshold change or gain change is provided.

As shown in the upper diagram of the sequence diagram in the offset/gain control state of FIG. 8, the biological sensor 4 and the system unit microcomputer 2 shift to the offset/gain control state and change the offset control threshold or change the gain (S8). The biological sensor 4 acquires a detection biological signal (S9).

The biological sensor 4 performs signal processing on the acquired detection biological signal, converts it into a digital output biological signal, and transmits the output biological signal to the system unit microcomputer 2. The system unit microcomputer 2 acquires a reference signal (S10). When the system unit microcomputer 2 receives the output biological signal, the system unit microcomputer 2 gives a receipt acknowledgement (ACK) to the biological sensor 4. The system unit microcomputer 2 transmits the output biological signal and the reference signal to the terminal 12. The series of processes is performed until 500 msec elapses after the shift to the offset/gain control state.

The biological sensor 4 acquires a detection biological signal (S11) when 500 msec has elapsed from the shift to the offset/gain control state as shown in the lower diagram of the sequence diagram in the offset/gain control state of FIG. 8. The biological sensor 4 performs signal processing on the acquired detection biological signal, converts it into a digital output biological signal, and transmits the output biological signal to the system unit microcomputer 2.

The system unit microcomputer 2 acquires a reference signal (S12). The system unit microcomputer 2 transmits to the biological sensor 4 an instruction to restore the offset control threshold or an instruction to restore the gain.

The biological sensor 4 receives the restoration instruction and returns the offset control threshold to the original value or returns the programmable gain to the original value (S13). Accordingly, in the biological sensor 4 and the system unit microcomputer 2, the offset/gain control state is canceled (S14) and shifts to the normal state.

Thus, the restoration instruction of the offset control threshold or the restoration instruction of the gain is provided at the expiration of 500 msec. The offset/gain control state is canceled and shifts to normal state.

(Information Processing Method in Biological Sensor)

Figure 9:
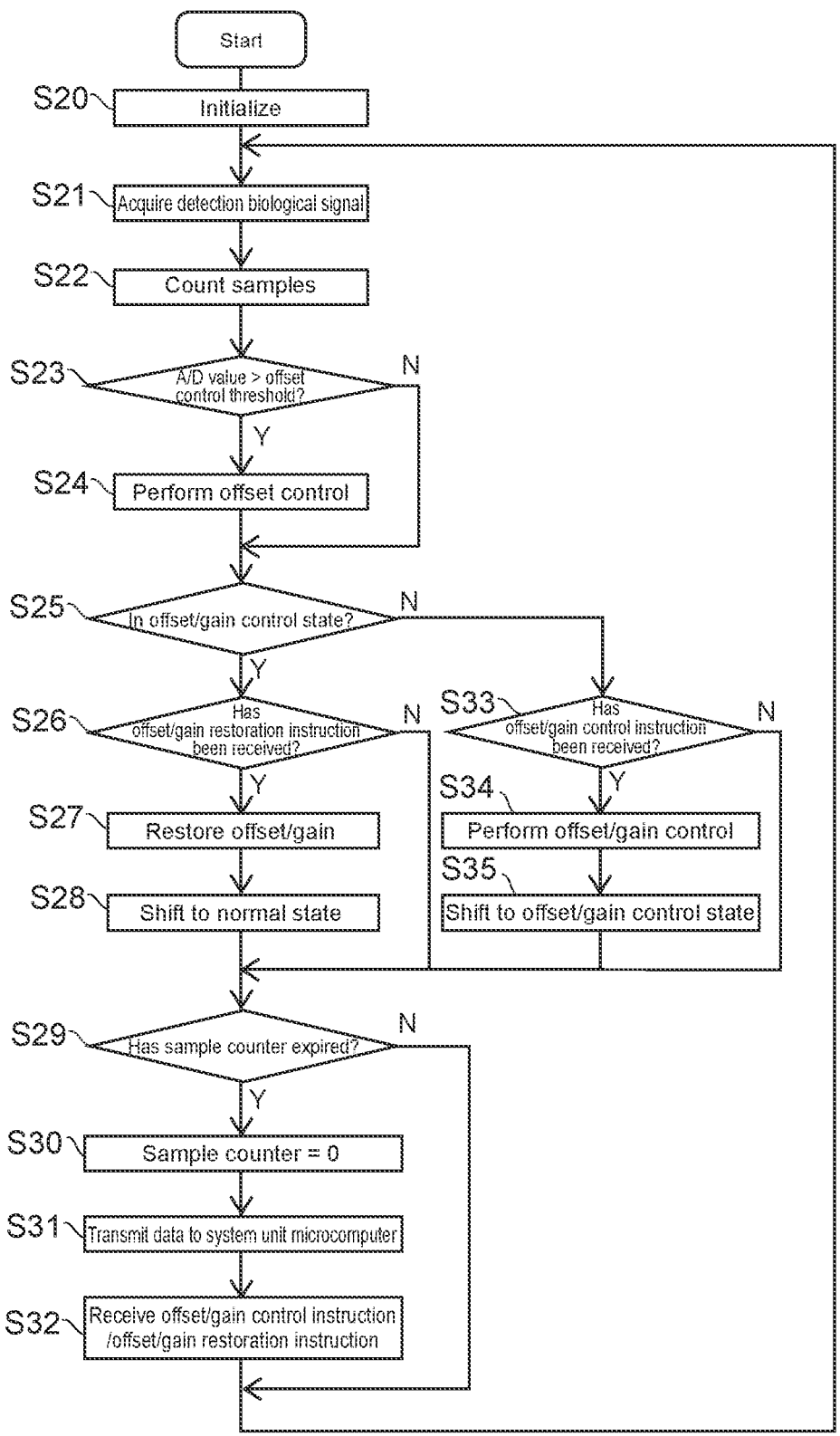
FIG. 9 A diagram describing an information processing method by the biological sensor.

FIG. 9 is a control flowchart describing an information processing method in the biological sensor 4.

As shown in FIG. 9, after the initialization is performed (S20), the detection biological signal acquisition unit 42 acquires the detection biological signal (S21).

The detection biological signal is sampled at a sampling frequency of 256 Hz, for example. A sample counter counts how many times detection biological signals have been read out (S22). The acquired detection biological signals are subjected to signal processing by the AFE circuit 48, and then converted by the ADC 47 to digital form. The sensor control unit 41 compares the A/D value converted to digital form with the offset control threshold and determines whether or not the A/D value exceeds the offset control threshold (S23). In a case where it is determined that the A/D value exceeds the offset control threshold (YES), the offset control is performed (S24) and the processing proceeds to S25. In a case where it is determined that the A/D value does not exceed the offset control threshold (NO), the processing proceeds to S25.

In S25, the sensor control unit 41 determines whether or not the biological sensor 4 is in the offset/gain control state.

In a case where it is determined in S25 that the biological sensor 4 is in the offset/gain control state (YES), it is determined whether or not an offset control threshold restoration instruction or a gain restoration instruction has been received (S26). In a case where it is determined that the offset control threshold restoration instruction or the gain restoration instruction has been received (YES), the sensor control unit 41 controls the AFE circuit 48 to return the offset control threshold or the gain to that in the normal state (S27) and the state shifts to the normal state (S28).

In a case where it is determined in S25 that the biological sensor 4 is not in the offset/gain control state (NO), whether or not an offset control threshold change instruction or a gain change instruction has been received is determined (S33). In a case where it is determined that the offset control threshold change instruction or the gain change instruction has not been received (NO), the processing proceeds to S29. In a case where it is determined that the offset control threshold change instruction or the gain change instruction has been received (YES), the sensor control unit 41 controls the AFE circuit 48 to change the offset control threshold or the gain (S34), the processing proceeds to the offset/gain control state (S35) and the processing proceeds to S29.

In S29, it is determined whether or not the sample counter value exceeds a predetermined numerical value (S29). In a case where it is determined that the sample counter value does not exceed a predetermined numerical value (NO), the processing returns to S21 and the series of processes is repeated. In a case where it is determined that the sample counter value exceeds a predetermined numerical value (YES), the sample counter value is set to 0 (S30). Next, the sensor control unit 41 transmits the output biological signal (biological data) to the system unit microcomputer 2 (S31). Next, the sensor control unit 41 receives a change instruction of the offset control threshold or the gain, a restoration instruction of the offset control threshold or the gain, or an ACK (S32), the processing returns to S21 and is repeated.

(Information Processing Method in System Unit Microcomputer)

Figure 10:
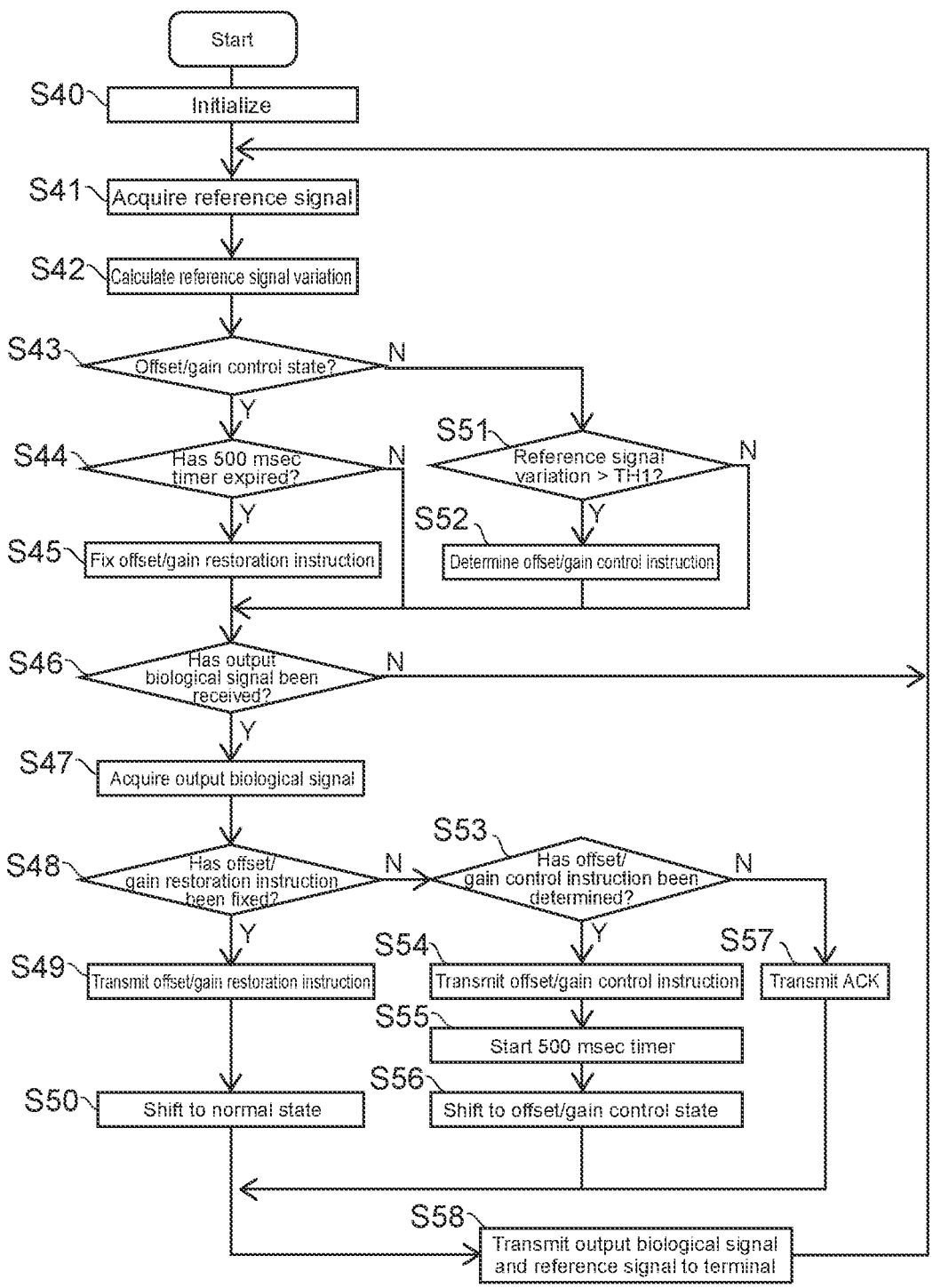
FIG. 10 A diagram describing an information processing method by the system unit microcomputer.

FIG. 10 is a control flowchart describing an information processing method in the system unit microcomputer 2.

As shown in FIG. 10, after the initialization is performed (S40), the reference signal acquisition unit 21 acquires a reference signal (S41).

Next, the body motion noise prediction unit 22 calculates, on the basis of the reference signal, a reference signal variation value (reference signal variation value) by using the equation of the square root of the sum of the squares of the respective differences of the respective reference signals described above (S42).

Next, the system control unit 20 determines whether or not the system unit microcomputer 2 is in the offset/gain control state (S43).

In a case where it is determined in S43 that the offset/gain control state is set (YES), it is determined whether or not the 500 msec timer has expired (S44). In a case where the system control unit 20 determines that the 500 ms timer has expired (YES), a restoration instruction of the offset control threshold or the gain is fixed (S45) and the processing proceeds to S46. In a case where it is determined in S44 that the 500 msec timer has not expired (NO), the processing proceeds to S46.

In a case where it is determined not offset/gain control state in S43 (NO), the body motion noise prediction unit 22 determines whether or not the calculated reference signal variation value is larger than the first threshold (TH1) (S51). In a case where it is determined in S51 that the calculated reference signal variation value is larger than the first threshold (YES), a change instruction of the offset control threshold or the gain is fixed (S52). In a case where it is determined in S51 that the reference signal variation value is equal to or smaller the first threshold (NO), the processing proceeds to S46.

In S46, the system control unit 20 determines whether or not an output biological signal has been received. In a case where it is determined that the output biological signal has not been received, the processing returns to S41 and is repeated. In a case where it is determined that the output biological signal has been received, the output biological signal is acquired (S47).

Next, it is determined whether a restoration instruction of the offset control threshold or the gain has been fixed (S48). In a case where it is determined in S48 that the restoration instruction of the offset control threshold or the gain has been fixed, the restoration instruction of the offset control threshold or the gain is transmitted to the biological sensor 4 (S49), the state shifts to the normal state (S50), and the processing proceeds to S58.

In a case where it is determined in S48 that the restoration instruction of the offset control threshold or the gain has not been fixed, it is determined whether or not a change instruction of the offset control threshold or the gain has been fixed in S53. In a case where it is determined in S53 that the change instruction of the offset control threshold or the gain has not been fixed (NO), an ACK is transmitted to the biological sensor 4 (S57) and the processing proceeds to S58. In a case where it is determined in S53 that the change instruction of the offset control threshold or the gain has been fixed (YES), the change instruction of the offset control threshold or the gain is transmitted to the biological sensor 4 (S54). Next, the 500 msec timer is started (S55), the system unit microcomputer 2 shifts to the offset/gain control state, and the processing proceeds to S58.

In S58, the system control unit 20 transmits the output biological signal (biological data) and the reference signal (reference signal data) to the terminal 12. Next, the processing returns to S41 and is repeated.

[Supplementary Description of this Embodiment]

Hereinafter, the description of this embodiment will be supplemented.

(Description of the fact that body motion noise appears in the detection biological signal with a time delay from the detection of body motion by the reference signal sensor)

With reference to FIGS. 11A, 11B, 11C, 11D, 12A, and 12B, a description will be given of the fact that the body motion noise appears in the detection biological signal with a time delay from the detection of the body motion by the reference signal sensor. In FIGS. 11A, 11B, 11C, and 11D, the horizontal axis represents the time axis. FIGS. 11A, 11B, 11C, and 11D have the same time axis and correspond to one another.

Figure 11A:
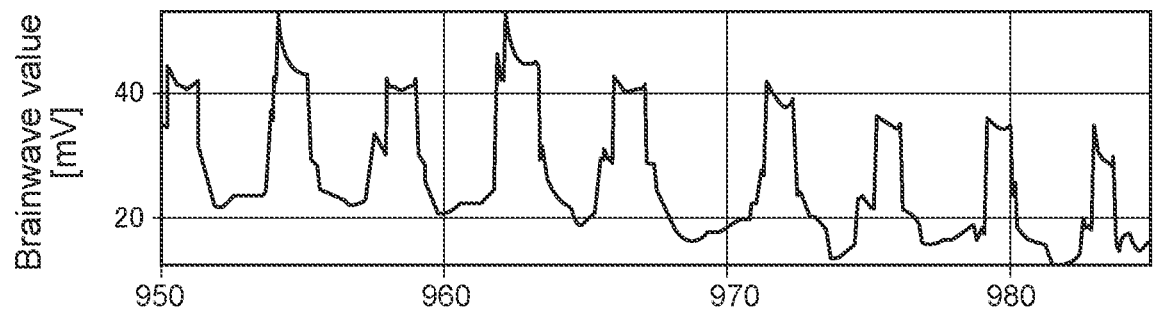
FIGS. 11A, 11B, 11C, and 11D The diagrams describing the fact that delayed from the time at which the reference signal sensor detects body motion, body motion noise caused by the body motion appears in a detection biological signal.

FIG. 11A is an example of a biological signal (brainwave signal) detected from the biological sensor 4 and is a graph of sampling at a sampling period of 256 Hz.

Figure 11B:
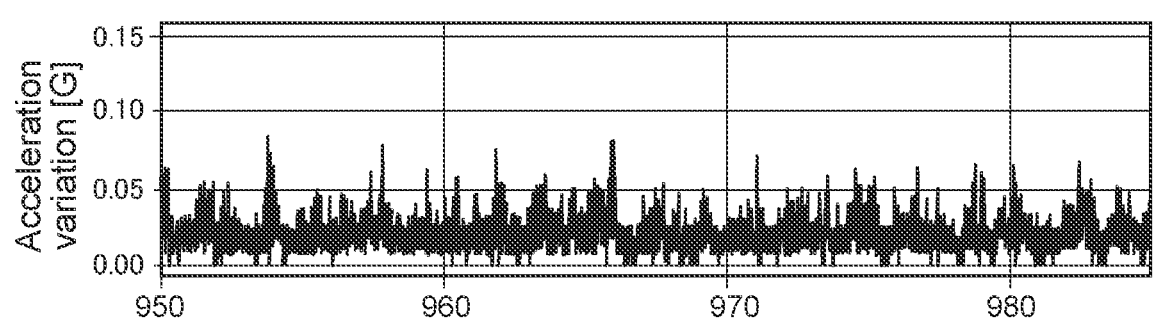

FIG. 11B is a graph of reference signal variation value (acceleration variation value) calculated by the equation of the square root of the sum of the squares of the respective differences of the respective reference signals described above by using a reference signal (acceleration) detected from the reference signal sensor (three-axis acceleration sensor) 9.

Figure 11C:
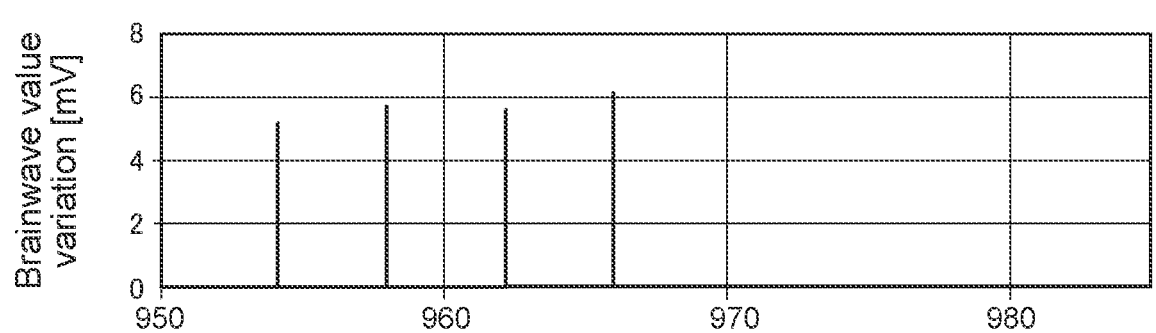

FIG. 11C is a diagram in which parts where the biological signal value variations (brainwave value variation) are sudden variations by 5.1 mV or more have been extracted on the basis of FIG. 11A. In the example shown in FIG. 11C, four peaks indicating sudden variations have been extracted.

Figure 11D:
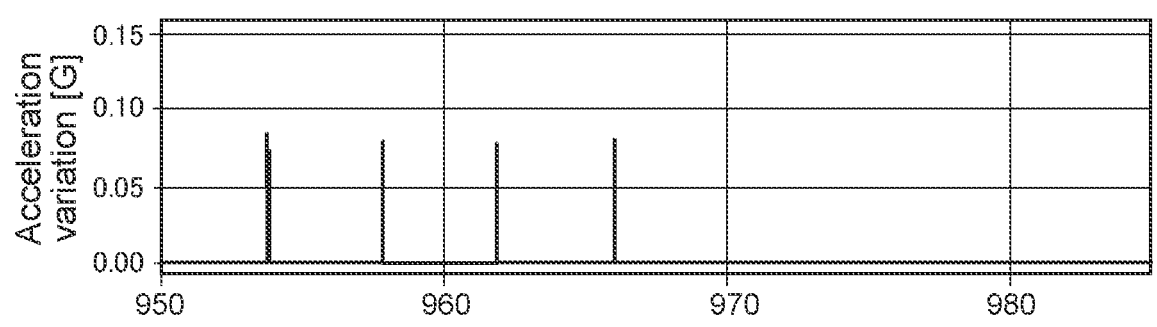

FIG. 11D is a diagram in which parts where the reference signal variation value variations (acceleration variation value) are sudden variations by 0.07 G or more have been extracted on the basis of FIG. 11B. In the example shown in FIG. 11D, four peaks indicating sudden variations are extracted.

As shown in FIGS. 11C and 11D, it can be seen that there is a correlation between the appearance of the sudden acceleration variation and the appearance of the sudden brainwave value variation in time, and it can be seen that the brainwave variation appears slightly later from the appearance of the acceleration variation.

Figure 12A:
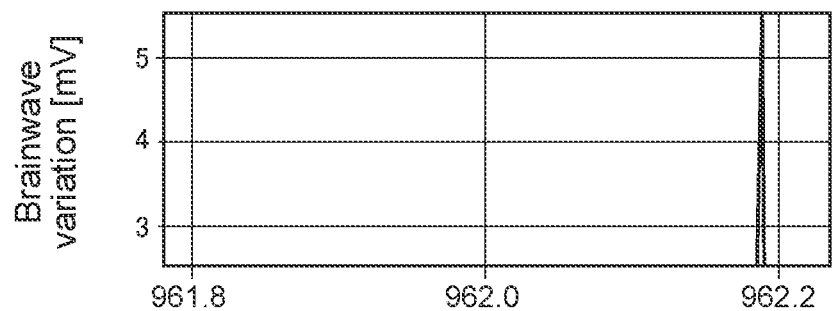
FIGS. 12A and 12B The partially enlarged diagrams of FIGS. 11C and 11D and diagrams describing the fact that the body motion noise appears in the detection biological signal with a time delay.
Figure 12B:
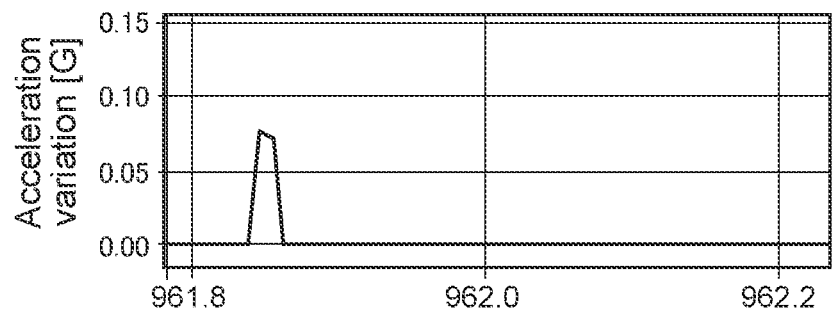

FIGS. 12A and 12B are diagrams obtained by partially enlarging FIGS. 11C and 11D, respectively. As shown in FIGS. 12A and 12B, it can be seen that the brainwaves vary suddenly with a delay of at most 400 msec after the sudden acceleration variation appears.

In this manner, it can be seen that the body motion noise caused by the body motion appears in the detection biological signal, delayed from the time at which the body motion of the person to be measured occurs, which can be read from the detection result of the reference signal sensor.

(Specific Example of Offset Control Threshold Change)

FIGS. 13A, 13B, 13C, and 13D are diagrams showing examples of a change in the number of times exceeding the dynamic range by the offset control threshold change. As described above, the offset control is activated by exceeding the offset control threshold. In each of FIGS. 13A, 13B, 13C, and 13D, the vertically extending straight line located on the left side in the figure indicates the dynamic range 37, broken lines 32 indicate the offset control threshold, and a straight solid line 33 indicates the center of the dynamic range 37.

FIG. 13A shows a brainwave signal example, the number of times of samples exceeding the dynamic range, the signal availability rate, and the number of times of offset control in a case where the offset control threshold is set to 85% and the signal processing is performed. Considering samples for ±1 seconds of samples that have exceeded the dynamic range 37 as inaccurate samples, the signal availability rate refers to a rate obtained by dividing the number of samples, which is obtained by subtracting inaccurate samples from the total number of samples, by the total number of samples. The higher the signal availability rate, the less the number of times exceeding the dynamic range 37.

FIGS. 13B, 13C, and 13D each show a brainwave signal example, the number of times of samples exceeding the dynamic range 37, the signal availability rate, and the number of times of offset control in a case where the offset control threshold is set to 50%, 20%, and 20% and the signal processing is performed.

FIGS. 13A, 13B, and 13C show results of sampling brainwaves at 256 Hz and FIG. 13D shows a result of sampling at 512 Hz.

As shown in FIGS. 13A, 13B, 13C, and 13D, it can be seen that as the offset control threshold becomes closer to the center of the dynamic range indicated by the solid line 33, that is, as the range of the broken lines 32 and 32 indicating the offset control threshold becomes narrower, the number of times exceeding the dynamic range decreases and the signal availability rate increases. That is, the accuracy of the acquired biological data can be improved.

Moreover, as shown in FIGS. 13C and 13D, by doubling the sampling frequency, it can be seen that the number of times exceeding the dynamic range decreases and the signal availability rate increases. This is because the sudden variation width can be reduced by finely sampling the sudden variation of the brainwave signal due to the body motion, and the offset control can be performed each time, and exceeding the dynamic range can be further suppressed.

Thus, it is possible to suppress the occurrence of exceeding the dynamic range by predicting in advance that body motion noise is added and making a setting to narrow the range of the offset control threshold so that the offset control threshold becomes closer to the center of the dynamic range.

It should be noted that the example in which the sampling frequency is 256 Hz, the offset control threshold is 85% in the normal state, and the offset control threshold is 20% in the offset/gain control state has been described in the embodiment described above, though not limited thereto.

Here, the number of times of offset control increases as the offset control threshold to be set becomes closer to the center of the dynamic range. The increase in the number of times of offset control increases the power consumption.

On the other hand, in this embodiment, the normal state is restored from the offset/gain control state after the predetermined time has elapsed with the timer as described above. Accordingly, the offset control threshold is changed only in a situation where body motion noise is added to the detection biological signal, and the offset control threshold is not changed in the period in which there is no body motion. Therefore, the number of times of offset control in the period in which there is no body motion is reduced, and the increase in the power consumption is suppressed.

Other Configuration Examples

Embodiments of the present technology are not limited to the above-mentioned embodiment, and various modifications can be made without departing from the gist of the present technology.

For example, in the above-mentioned embodiment, the example in which the EEG sensor that detects brainwave signals as the biological sensor has been described, though not limited thereto. For example, the present technology can be applied to a pulse wave sensor, a blood flow sensor, or a sweat sensor as the biological sensor. In these biological sensors, as in the above-mentioned embodiment, body motion noise due to body motion appears in a signal detected by the biological sensor, delayed from the time at which the body motion of the person to be measured, which is observed by the reference signal sensor, occurs. Therefore, it is possible to predict that the body motion noise is added to the detection biological signal on the basis of the detection result of the reference signal sensor, and it is possible to control the offset control threshold or the gain associated with the signal processing of the detection biological signal in advance. Accordingly, the detection biological signal containing the body motion noise is prevented from departing from the dynamic range of the ADC, and the accuracy of the acquired biological data can be improved.

The pulse wave sensor detects pulse waves of a living body to be detected by irradiating the living body to be detected with light from a light source such as a light-emitting diode and obtaining a signal indicating the intensity of light reflected from the living body to be detected by a light-receiving elements such as a photodiode. Since hemoglobin in blood flowing in blood vessels of the living body to be detected has a light absorption property, pulse waves of a detection target are detected by observing light reflected by the photodiode.

The blood flow sensor is an optical sensor that measures a blood flow rate. The blood flow sensor irradiates a body site of a person to be measured with light (e.g., laser light or infrared light) and measures a blood flow rate on the basis of the reflected light. For example, a forehead can be irradiated with light and the rate of cerebral blood flow can be measured on the basis of the reflected light. The blood flow sensor includes a light-emitting element (e.g., a laser diode) and a light-receiving element (e.g., a photodiode). The blood flow sensor may include a plurality of light-receiving elements. The blood flow sensor may include a plurality of light-emitting elements.

The sweat sensor is a sensor that detects sweat secreted from sweat glands of the skin (e.g., eccrine sweat glands). Sweat makes the skin more electrically conductive. Thus, sweat can be detected by acquiring the electrodermal activity (EDA) of the skin. In the sweat sensor, a weak current is applied to the skin to measure an electrical resistance value, and skin conductance activity (SCA) can be calculated as an inverse of the electrical resistance value. The SCA is sweat data. It should be noted that the sweat data is not limited to one that calculates the SCA, and may be one that calculates a skin potential.

Moreover, for example, in the biological data measurement system of the above-mentioned embodiment, the example in which the biological data is acquired by using biological sensors of a single type that detect brainwaves has been described, though a plurality of biological sensors of different types may be used. In this case, thresholds used for body motion noise level determination are set as appropriate for each of the different types of biological sensors.

Moreover, for example, in the embodiment described above, the example in which the three-axis acceleration sensor is used as the reference signal sensor has been described, though a three-axis gyro sensor or a pressure sensor provided attached to the bioelectrode 5 (hereinafter, referred to as living body contact portion pressure sensor) may be used.

The three-axis gyro sensor detects angular velocity (rotational speed). Even in a case of using the three-axis gyro sensor, the above-mentioned equation can be used for calculating a reference signal variation value. In this case, in the equation, N=3, r1 denotes X-axis angular velocity, r2 denotes Y-axis angular velocity, and r3 denotes Z-axis angular velocity.

The living body contact portion pressure sensor detects a stress applied to the skin of the person to be measured. For example, a force sensor such as a piezoelectric sensor, a strain sensor such as a strain gauge, a sensor that detects deformation of a piezoelectric film, or the like can be used as the living body contact portion pressure sensor. Even in the case of using the living body contact portion pressure sensor, the above-mentioned equation can be used for calculating the reference signal variation value. In this case, in the equation, N represents the number of living body contact portion pressure sensors.

Moreover, the body motion information may be obtained by using a plurality of reference signal sensors of different types. For example, two or all three selected from the three-axis acceleration sensor, the three-axis gyro sensor, and the living body contact portion pressure sensor may be used as the reference signal sensors. In a case of using the plurality of reference signal sensors of different types, a reference signal variation can be obtained for each of the different types of sensors, and body motion information such as a body motion noise level can be obtained on the basis of the result.

Moreover, different types of reference signal sensors may be used for each of the plurality of biological sensors of different types. For example, in one biological data measurement system, a pulse wave sensor and an EEG sensor may be used as the biological sensors, a three-axis acceleration sensor may be used as the reference signal sensor for the EEG sensor, and a living body contact portion pressure sensor may be used for the pulse wave sensor.

In a case where the living body contact portion pressure sensor is used as the reference signal sensor, the living body contact portion pressure sensor can be provided in each of a plurality of detection units (corresponding to bioelectrodes in the above embodiment) that is held in contact with different body sites of the person to be measured and acquires detected biological signals of the respective body sites. Accordingly, the prediction of the occurrence of the body motion noise can be determined for each biological sensor, and an instruction to change the offset control threshold or the gain can be given for each biological sensor.

It should be noted that the plurality of detection units may correspond to biological sensors of the same type, or may correspond to a plurality of biological sensors of different types. For example, in one biological data measurement system, a pulse wave sensor and an EEG sensor may be used as a biological sensor, a detection unit corresponding to the pulse wave sensor may be provided to be held in contact with the wrist, a detection unit corresponding to the EEG sensor may be provided to be held in contact with the head, and a living body contact portion pressure sensor as the reference signal sensor may be provided in each of the detection units.

Moreover, for example, in the above-mentioned embodiment, the example in which one of the offset control threshold change and the gain change is performed in accordance with the body motion noise level in the offset/gain control state has been described, though both the offset control threshold change and the gain change may be performed.

Moreover, for example, in the offset/gain control state, the signal control may be performed in three divided stages of only the offset control threshold change, only the gain change, and the change of both the offset control threshold and the gain in a manner that depends on the body motion noise level.

Moreover, for example, the change to lower the gain may be performed in the control state. In this case, it is possible to adjust the period of the control state by providing a timer, and therefore it is possible to shorten the period in which the signal resolution is lower.

Moreover, for example, in the control state, a change to narrow the offset control threshold may be performed. In this case, it is possible to adjust the period of the control state by providing a timer, it is possible to adjust to shorten the period of the increase in the power consumption caused by the increase in the number of times of offset control.

Moreover, in the above-mentioned embodiment, the example in which the system unit microcomputer 2 having the system control unit 20 and the body motion noise prediction unit 22 is mounted on the head fixing support 14 has been described, though not limited thereto. For example, the system control unit 20 and the body motion noise prediction unit 22 may be provided in an information processing apparatus separate from the head fixing support 14, such as a cloud server. Moreover, for example, the sensor control unit 41 and the AFE circuit 48 of the biological sensor 4 may be provided in an information processing apparatus or a system unit microcomputer separate from the head fixing support 14 such as a cloud server. Moreover, the sensor control unit 41, the AFE circuit 48, the system control unit 20, and the body motion noise prediction unit 22 may be provided in an information processing device separate from the head fixing support 14 such as a cloud server.

It should be noted that the present technology may also take the following configurations.

(1)

An information processing apparatus, including:
- a body motion noise prediction unit that predicts, on the basis of a reference signal that is body motion information of a person to be measured detected by a reference signal sensor, that body motion noise caused by body motion of the person to be measured is added to a detection biological signal detected by a biological sensor from the person to be measured; and
- a control unit that controls signal processing of the detection biological signal on the basis of a prediction result of the body motion noise prediction unit.

(2)

The information processing apparatus according to (1), in which
the control unit changes, on the basis of the prediction result, at least one of an offset control threshold or a gain to be used when controlling an offset of the detection biological signal and performs signal processing on the detection biological signal.

(3)

The information processing apparatus according to (1) or (2), in which
the body motion noise prediction unit compares a variation value of the reference signal with a threshold prepared in advance and predicts that the body motion noise is added to the detection biological signal.

(4)

The information processing apparatus according to (3), in which
the body motion noise prediction unit determines a body motion noise level from a comparison result of the variation value of the reference signal with the threshold prepared in advance, and
the control unit changes at least one of the offset control threshold or the gain on the basis of the body motion noise level.

(5)

The information processing apparatus according to (3) or (4), in which
the control unit takes a normal state in a case where the variation value of the reference signal is equal to or smaller than the threshold, and takes a control state to change at least one of the offset control threshold or the gain to be different from the at least one of the offset control threshold or the gain in the normal state in a case where the variation value of the reference signal is larger than the threshold.

(6)

The information processing apparatus according to (5), in which
the control unit returns the changed offset control threshold or gain to the normal state after a predetermined time has elapsed after the offset control threshold or gain is changed from the normal state to the control state.

(7)

The information processing apparatus according to (5) or (6), in which
the control unit narrows a range of the offset control threshold in the control state than in the normal state.

(8)

The information processing apparatus according to any one of (5) to (7), in which
the control unit lowers the gain in the control state than in the normal state.

(9)

The information processing apparatus according to any one of (3) to (8), in which
the threshold includes a first threshold and a second threshold larger than the first threshold, and
the control unit narrows a range of the offset control threshold from the normal state in a case where the variation value of the reference signal is equal to or larger than the first threshold and is smaller than the second threshold, and lowers the gain in a case where the variation value of the reference signal is equal to or larger than the second threshold.

(10)

The information processing apparatus according to any one of (3) to (9), in which
the variation value of the reference signal is calculated by using a two-point difference in a time domain of the reference signal.

(11)

The information processing apparatus according to any one of (1) to (10), in which
the reference signal sensor includes at least one of a three-axis acceleration sensor, a three-axis gyro sensor, or a pressure sensor.

(12)

The information processing apparatus according to (11), in which
the pressure sensor is provided for each of a plurality of detection units that is held in contact with different body sites of the person to be measured and acquires the detection biological signal,
the body motion noise prediction unit predicts, for each of the body sites, on the basis of the reference signal detected by each of the pressure sensors, that the body motion noise is added to the detection biological signal, and
the control unit changes, for each of the body sites, on the basis of a prediction result, at least one of the offset control threshold or the gain to be used when controlling the offset of the detection biological signal and performs signal processing on the detection biological signal.

(13)

The information processing apparatus according to any one of (1) to (12), in which
the biological sensor includes at least one of an electroencephalogram (EEG) sensor, a pulse wave sensor, a blood flow sensor, or a sweat sensor.

(14)

A biological data measurement system, including:
a reference signal sensor that detects a reference signal that is body motion information of a person to be measured;
a biological sensor that detects a detection biological signal of the person to be measured;
a body motion noise prediction unit that predicts, on the basis of the reference signal, that body motion noise is added to the detection biological signal; and
a control unit that controls signal processing of the detection biological signal on the basis of a prediction result of the body motion noise prediction unit.

(15)

An information processing method, including:
predicting, on the basis of a reference signal that is body motion information of a person to be measured detected by a reference signal sensor, that body motion noise is added to a detection biological signal detected by a biological sensor from the person to be measured; and
controlling signal processing of the detection biological signal on the basis of a result of predicting.

(16)

A program that causes an information processing apparatus to execute processing including:
a step of predicting, on the basis of a reference signal that is body motion information of a person to be measured detected by a reference signal sensor, that body motion noise is added to a detection biological signal detected by a biological sensor from the person to be measured; and
a step of controlling signal processing of the detection biological signal on the basis of a result of predicting.

REFERENCE SIGNS LIST 1 biological data measurement system
2 system unit microcomputer (information processing apparatus)
3 three-axis acceleration sensor (reference signal sensor)
4 sensor (biological sensor)
5 bioelectrode (detection unit)
7 EEG sensor (biological sensor)
20 system control unit (control unit)
22 body motion noise prediction unit

The invention claimed is:

1. An information processing apparatus, comprising:
circuitry configured to:
control at least one biological sensor to detect a biological signal related to a person;
acquire a reference signal from a reference signal sensor, wherein the acquired reference signal indicates body motion information related to the person;
determine a reference signal variation of the reference signal based on computation of a two-point difference in a time domain between a current reference signal value and a previous reference signal value;
compare the determined reference signal variation with a first set of threshold values;
determine a body motion noise level based on the comparison of the determined reference signal variation with the first set of threshold values;
generate, based on the reference signal variation, an instruction to modify a signal processing parameter of an analog front-end circuit before the detected biological signal exceeds a dynamic range of an analog-to-digital converter, to keep the detected biological signal within the dynamic range, wherein the signal processing parameter comprises at least one of a first offset control threshold or a first gain value;
control the analog front-end circuit of the at least one biological sensor, based on the generated instruction, to apply the modified signal processing parameter to modify the detected biological signal;

convert, based on the analog-to-digital converter, the modified biological signal into a digital biological signal; and transmit the digital biological signal to an output terminal associated with the information processing apparatus, wherein the transmission of the digital biological signal is for presentation of the digital biological signal as biological data.

2. The information processing apparatus according to claim 1, wherein the circuitry is further configured to:

change, based on the determined body motion noise level, the at least one of the first offset control threshold or the first gain value; and control an offset of the detected biological signal based on the change.

3. The information processing apparatus according to claim 1, wherein the circuitry is further configured to determine, based on the comparison, that a body motion noise is present in the detected biological signal.

4. The information processing apparatus according to claim 1, wherein the circuitry is further configured to:

compare the determined reference signal variation value with a second set of threshold values;

determine the body motion noise level based on the comparison of the determined reference signal variation value of the reference signal with the second set of threshold values; and change at least one of the first offset control threshold or the first gain value based on the determined body motion noise level.

5. The information processing apparatus according to claim 4, wherein the circuitry is further configured to initiate:

a normal state in a case where the determined reference signal variation value of the reference signal is equal to or smaller than a first threshold value of the second set of threshold values; and a control state in a case where the determined reference signal variation value of the reference signal is larger than the first threshold value, and in the normal state, the circuitry is further configured to control the detected biological signal based on at least one of:

a second offset control threshold different from the first offset control threshold of the control state, or a second gain value different from the first gain value of the control state.

6. The information processing apparatus according to claim 5, wherein the circuitry is further configured to return from the control state to the normal state after an elapse of a specific time from a change from the normal state to the control state.

7. The information processing apparatus according to claim 5, wherein the first offset control threshold in the control state is lower than the second offset control threshold in the normal state.

8. The information processing apparatus according to claim 5, wherein the first gain value in the control state is lower than the second gain value in the normal state.

9. The information processing apparatus according to claim 4, wherein the second set of threshold values includes a first threshold and a second threshold, the second threshold is larger than the first threshold, and the circuitry is further configured to:

control the first offset control threshold of the detected biological signal in a case where the determined reference signal variation value of the reference signal is equal to or larger than the first threshold and is smaller than the second threshold; and control the first gain value of the detected biological signal in a case where the determined reference signal variation value of the reference signal is equal to or larger than the second threshold.

10. The information processing apparatus according to claim 1, wherein the reference signal sensor comprises at least one of a three-axis acceleration sensor, a three-axis gyro sensor, or a pressure sensor.

11. The information processing apparatus according to claim 10, further comprising a plurality of bioelectrodes, wherein the pressure sensor is attached to the plurality of bioelectrodes for further detection of the reference signal, the plurality of bioelectrodes are at different body sites of the person, and the circuitry is further configured to:

control the plurality of bioelectrodes to acquire the biological signal;

determine, for each of the different body sites, based on the reference signal from the pressure sensor, that a body motion noise is present in the biological signal; and change, for each of the different body sites, at least one of the first offset control threshold or the first gain value of the biological signal based on the determination that the body motion noise is present in the biological signal for each of the different body sites.

12. The information processing apparatus according to claim 1, wherein the at least one biological sensor comprises at least one of an electroencephalogram (EEG) sensor, a pulse wave sensor, a blood flow sensor, or a sweat sensor.

13. A biological data measurement system, comprising:

a reference signal sensor configured to detect a reference signal that indicates body motion information related to a person;

a biological sensor configured to detect a biological signal related to the person;

an output terminal; and circuitry configured to:

determine a reference signal variation of the reference signal based on computation of a two-point difference in a time domain between a current reference signal value and a previous reference signal value;

compare the determined reference signal variation with a first set of threshold values;

determine a body motion noise level based on the comparison of the determined reference signal variation with first set of threshold values;

generate, based on the reference signal variation, an instruction to modify a signal processing parameter of an analog front-end circuit before the detected biological signal exceeds a dynamic range of an analog-to-digital converter, to keep the detected biological signal within the dynamic range, wherein the signal processing parameter comprises at least one of an offset control threshold or a gain value;

control the analog front-end circuit of the biological sensor, based on the generated instruction, to apply the modified signal processing parameter to modify the detected biological signal;

convert, based on the analog-to-digital converter, the modified detection biological signal into a digital biological signal; and transmit the digital biological signal to the output terminal, wherein the output terminal is configured to present the digital biological signal as biological data.

14. An information processing method, comprising:

in an information processing apparatus:

controlling at least one biological sensor to detect a biological signal related to a person;

acquiring a reference signal from a reference signal sensor, wherein the acquired reference signal indicates body motion information related to the person;

determining a reference signal variation of the reference signal based on computation of a two-point difference in a time domain between a current reference signal value and a previous reference signal value;

comparing the determined reference signal variation with a first set of threshold values;

determining a body motion noise level based on the comparison of the determined reference signal variation with the first set of threshold values;

generating, based on the reference signal variation, an instruction to modify a signal processing parameter of an analog front-end circuit before the detected biological signal exceeds a dynamic range of an analog-to-digital converter, to keep the detected biological signal within the dynamic range, wherein the signal processing parameter comprises at least one of an offset control threshold or a gain value;

controlling the analog front-end circuit of the at least one biological sensor, based on the generated instruction, to apply the modified signal processing parameter to modify the detected biological signal;

converting, based on the analog-to-digital converter, the modified biological signal into a digital biological signal; and transmitting the digital biological signal to an output terminal associated with the information processing apparatus, wherein the transmission of the digital biological signal is for presentation of the digital biological signal as biological data.

15. A non-transitory computer-readable medium having stored thereon, computer-executable instructions which, when executed by an information processing apparatus, cause the information processing apparatus to execute operations, the operations comprising:

controlling at least one biological sensor to detect a biological signal related to a person;

acquiring a reference signal from a reference signal sensor, wherein the acquired reference signal indicates body motion information related to the person;

determining a reference signal variation of the reference signal based on computation of a two-point difference in a time domain between a current reference signal value and a previous reference signal value;

comparing the determined reference signal variation with a first set of threshold values;

determining a body motion noise level based on the comparison of the determined reference signal variation with the first set of threshold values;

generating, based on the reference signal variation, an instruction to modify a signal processing parameter of an analog front-end circuit before the detected biological signal exceeds a dynamic range of an analog-to-digital converter, to keep the detected biological signal within the dynamic range, wherein the signal processing parameter comprises at least one of an offset control threshold or a gain value;

controlling the analog front-end circuit of the at least one biological sensor, based on the generated instruction, to apply the modified signal processing parameter to modify the detected biological signal;

converting, based on the analog-to-digital converter, the modified biological signal into a digital biological signal; and transmitting the digital biological signal to an output terminal associated with the information processing apparatus, wherein the transmission of the digital biological signal is for presentation of the digital biological signal as biological data.

* * * * *